US011991513B2

(12) United States Patent
Zheng et al.

(10) Patent No.: US 11,991,513 B2
(45) Date of Patent: May 21, 2024

(54) BONE CONDUCTION SPEAKER AND EARPHONE

(71) Applicant: SHENZHEN SHOKZ CO., LTD., Guangdong (CN)

(72) Inventors: Jinbo Zheng, Shenzhen (CN); Fengyun Liao, Shenzhen (CN); Lei Zhang, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 305 days.

(21) Appl. No.: 17/649,356

(22) Filed: Jan. 29, 2022

(65) Prior Publication Data

US 2022/0150637 A1 May 12, 2022

Related U.S. Application Data

(63) Continuation of application No. 17/078,276, filed on Oct. 23, 2020, now Pat. No. 11,310,601, which is a (Continued)

(30) Foreign Application Priority Data

Jun. 15, 2018 (CN) ......................... 201810623408.2

(51) Int. Cl.
*H04R 25/00* (2006.01)
*H04R 1/10* (2006.01)
(Continued)

(52) U.S. Cl.
CPC ................. *H04R 9/02* (2013.01); *H04R 1/10* (2013.01); *H04R 9/06* (2013.01); *H04R 25/604* (2013.01);
(Continued)

(58) Field of Classification Search
CPC .. H04R 25/606; H04R 2225/67; H04R 25/02; H04R 25/00
See application file for complete search history.

(56) References Cited

U.S. PATENT DOCUMENTS 5,850,460 A 12/1998 Tanaka et al.
9,253,563 B2 2/2016 Fukuda
(Continued)

FOREIGN PATENT DOCUMENTS

CN 105007551 A 10/2015
CN 105513131 A 4/2016
(Continued)

OTHER PUBLICATIONS

International Search Report in PCT/CN2019/070548 dated Mar. 25, 2019, 6 pages.
(Continued)

*Primary Examiner* — Amir H Etesam
(74) *Attorney, Agent, or Firm* — METIS IP LLC

(57) ABSTRACT

The present disclosure provides a bone conduction speaker. The bone conduction speaker may include a driving device and a panel. The driving device may be configured to generate a driving force, and the driving force is located in a straight line. The panel may be transmissibly connected to the driving device. The panel may be configured to conduct sound. A region through which the panel interacting with the user's body may have a normal line. The normal line may not be parallel to that straight line.

20 Claims, 21 Drawing Sheets

Related U.S. Application Data continuation of application No. PCT/CN2019/070548, filed on Jan. 5, 2019.

(51) Int. Cl.
*H04R 9/02* (2006.01)
*H04R 9/06* (2006.01)

(52) U.S. Cl.
CPC .. *H04R 2225/0213* (2019.05); *H04R 2400/11* (2013.01); *H04R 2460/13* (2013.01)

(56) References Cited

U.S. PATENT DOCUMENTS

| | | | |
|---|---|---|---|
| 11,310,601 | B2 | 4/2022 | Zheng et al. |
| 2002/0196955 | A1 | 12/2002 | Boesen et al. |
| 2006/0165246 | A1 | 7/2006 | Lee et al. |
| 2011/0280416 | A1 | 11/2011 | Abolfathi et al. |
| 2014/0064533 | A1 | 3/2014 | Kasic, II |
| 2014/0185837 | A1 | 7/2014 | Kunimoto et al. |
| 2014/0378191 | A1 | 12/2014 | Hosoi et al. |
| 2015/0264473 | A1 | 9/2015 | Fukuda |
| 2016/0212547 | A1 | 7/2016 | Kang |
| 2016/0234613 | A1 * | 8/2016 | Westerkull ............. H04R 25/60 |
| 2016/0241689 | A1 | 8/2016 | Watanabe |
| 2018/0160209 | A1 | 6/2018 | Ogata et al. |
| 2018/0199127 | A1 | 7/2018 | Hosol et al. |
| 2018/0220236 | A1 | 8/2018 | Sato et al. |
| 2019/0028580 | A1 | 1/2019 | Hosoi et al. |
| 2019/0082266 | A1 | 3/2019 | Qi et al. |
| 2019/0104352 | A1 | 4/2019 | Ozawa et al. |
| 2020/0336824 | A1 | 10/2020 | Zheng et al. |
| 2021/0092525 | A1 | 3/2021 | Zheng et al. |
| 2021/0160634 | A1 | 5/2021 | Liao et al. |
| 2021/0268281 | A1 | 9/2021 | Johansson et al. |
| 2022/0225037 | A1 | 7/2022 | Liao et al. |

FOREIGN PATENT DOCUMENTS

| | | | |
|---|---|---|---|
| CN | 106231507 | A | 12/2016 |
| CN | 106954152 | A | 7/2017 |
| CO | 12129395 | A | 8/2012 |
| JP | 2005080135 | A | 3/2005 |
| JP | 2009049844 | A | 3/2009 |
| JP | 2013102274 | A | 5/2013 |
| KR | 20100089353 | A | 8/2010 |
| KR | 20100106836 | A | 10/2010 |
| KR | 101910282 | B1 | 10/2018 |
| RU | 2359427 | C1 | 6/2009 |
| WO | 2007034739 | A1 | 3/2007 |
| WO | 2008007666 | A1 | 1/2008 |

OTHER PUBLICATIONS

Written Opinion in PCT/CN2019/070548 dated Mar. 25, 2019, 7 pages.

The Extended European Search Report in European Application No. 19819601.6 dated May 3, 2021, 10 pages.

Anonymous, Tech Note: Understanding Exciters-Principles and Applications, 2014, 8 pages.

First Examination Report in Russian Application No. 2021100590 dated Jul. 15, 2021, 12 pages.

Notice of Preliminary Rejection in Korean Application No. 10-2021-7000929 dated Jan. 25, 2022, 13 pages.

Notice of Reasons for Rejection in Japanese Application No. 2020569945 dated Feb. 21, 2022, 9 pages.

Cheng, Lei et al., Research of Calculating Method for Surface Normal Line of 3D-Entity Model, Transactions of Shenyang Ligong University, 28(4): 24-27, 2009.

Decision of Rejection in Japanese Application No. 2022076639 mailed on Jan. 29, 2024, 6 pages.

* cited by examiner

800

900a

9111

1000

1200

BONE CONDUCTION SPEAKER AND EARPHONE

CROSS-REFERENCE TO RELATED APPLICATIONS

This application is a continuation of U.S. application Ser. No. 17/078,276, filed on Oct. 23, 2020, which is a continuation of International Application No. PCT/CN2019/070548, filed on Jan. 5, 2019, which claims priority of Chinese Patent Application No. 201810623408.2, filed on Jun. 15, 2018, the contents of each of which are incorporated herein by reference.

TECHNICAL FIELD

The present disclosure generally relates to a speaker, and more particularly, to a method for improving the sound quality of a bone conduction speaker or a bone conduction earphone.

BACKGROUND

In general, people can hear sound because that vibration of the sound can be transmitted to the eardrum through the ear canal of the external ear via air. The vibration formed by the eardrum may drive the human auditory nerve to perceive the vibration of the sound. When a bone conduction speaker is working, the vibration of the sound may be transmitted to the human auditory nerve through the human skin, subcutaneous tissue, and bones, so that people can hear the sound.

SUMMARY

One embodiment of the present disclosure provides a bone conduction speaker. The bone conduction speaker may include a driving device and a panel. The driving device may be configured to generate a driving force, and the driving force is located in a straight line. The panel may be transmissibly connected to the driving device. The panel may be configured to conduct sound. A region through which the panel interacting with the user's body may have a normal line. The normal line may not be parallel to that straight line.

In some embodiments, the straight line may have a positive direction pointing out of the bone conduction speaker via the panel, the normal line may have a positive direction pointing out of the bone conduction speaker, and an angle between the two lines in the positive direction may be an acute angle.

In some embodiments, the driving device may include a coil and a magnetic system. An axis of the coil and an axis of the magnetic system may not be parallel to the normal line. The axis may be perpendicular to at least one of a radial plane of the coil and a radial plane of the magnetic system.

In some embodiments, the bone conduction speaker may further include a housing. The housing may be connected to the panel via a connection medium, or the housing and the panel may be integrally formed.

In some embodiments, the coil may be connected to at least one of the panel and the housing through a first transmissible path, and the magnetic system may be connected to at least one of the panel and the housing through a second transmission path.

In some embodiments, the first transmission path may include a connection component, and the second transmission path may include a vibration transmission sheet. A stiffness of the connection component may be higher than a stiffness of the vibration transmission sheet.

In some embodiments, the stiffness of a component on the first transmission path or the second transmission path may be positively correlated with the elastic modulus and thickness of the component and negatively correlated with the surface area of the component.

In some embodiments, a stiffener may be provided on the connection component.

In some embodiments, the stiffener may be a facade or a support rod.

In some embodiments, the connection component may be a hollow cylinder. One end surface of the hollow cylinder may be connected to one end surface of the coil, and the other end surface of the hollow cylinder may be connected to at least one of the panel and the housing.

In some embodiments, the connection component may be a group of connecting rods. One end of each connecting rod may be connected to one end surface of the coil, and the other end of each connecting rod may be connected to at least one of the panel and the housing. Each connecting rod may be distributed circumferentially around the coil.

In some embodiments, the driving force may have a component in at least one of a first quadrant and a third quadrant of an xoy plane coordinate system. An origin o of the xoy plane coordinate system may be located on a contact surface of the bone conduction speaker with the user's body. An x axis may be parallel to a human coronal axis. An y axis may be parallel to a human sagittal axis. A positive direction of the x axis may be toward an outside of the user's body. A positive direction of the y axis may be toward a front of the human body.

In some embodiments, a count of the driving devices may be at least two. A straight line where a resultant force composed of driving forces generated by each driving device is located may not be parallel to the normal line.

In some embodiments, a straight line where the first driving force generated by the first driving device is located may be parallel to the normal line, and a straight line where the second driving force generated by the second driving device is located may be perpendicular to the normal line.

In some embodiments, an area of the panel may be in a range from 20 $mm^2$ to 1000 $mm^2$.

In some embodiments, a length of a side length of the panel may be in a range from 5 mm to 40 mm, or 18 mm to 25 mm, or 11 to 18 mm.

In some embodiments, an angle may be formed between the straight line where the driving force is located and the normal line. The angle may be a value between 5° and 80°, or a value between 15° and 70°, or a value between 25° and 50°, or a value between 25° and 40°, or a value between 28° and 35°, or a value between 27° and 32°, or a value between 30° and 35°, or a value between 25° and 60°, or a value between 28° and 50°, or a value between 30° and 39°, or a value between 31° and 38% or a value between 32° and 37°, or a value between 33° and 36°, or a value between 33° and 35.8% or a value between 33.5° and 35°.

In some embodiments, the angle between the straight line where the driving force is located and the normal line may be 26°±0.2, 27°±0.2, 28°±0.2, 29°±0.2, 30°±0.2, 31°±0.2, 32°±0.2, 33°±0.2, 34°±0.2, 34.2°±0.2, 35°±0.2, 35.8°±0.2, 36°±0.2, 37°±0.2, or 38°±0.2.

In some embodiments, the region through which the panel interacting with a user's body may be a plane.

In some embodiments, the region through which the panel interacting with a user's body may be a quasi-plane. The normal line of the region may be an average normal line of the region. The average normal line may be represented by:

$$\hat{r}_0 = \frac{\oiint_S \hat{r} ds}{|\oiint_S \hat{r} ds|},$$

where $\hat{r}_0$ denotes the average normal line, $\hat{r}$ denotes the normal line at any point on the plane, and ds denotes the infinitesimal plane. The quasi-plane may be a plane that the angle between the normal line of a point within at least 50% of the plane and the average normal line is less than a predetermined threshold.

In some embodiments, the predetermined threshold may be less than 10°.

Another embodiment of the present disclosure provides another bone conduction speaker. The bone conduction speaker may include a panel and a driving device. The panel may be transmissibly connected to the driving device. The panel may be configured to conduct sound. A region through which the panel interacting with the user's body may have a normal line. An axis of the driving device may not be parallel to the normal line. The driving device may include a coil and a magnetic system. The axis of the driving device may be perpendicular to a radial plane of the coil and/or a radial plane of the magnetic system.

In some embodiments, the bone conduction speaker may further include a housing. The housing may be connected to the panel via a connection medium, or the housing and the panel may be integrally formed.

In some embodiments, the coil may be connected to the panel and/or the housing through a connection component.

In some embodiments, a stiffener may be provided on the connection component.

In some embodiments, the stiffener may be a facade or a support rod.

In some embodiments, one side of the connection component may be shorter than the other side so that the axis of the coil is not parallel to the normal line.

In some embodiments, the connection component may be a hollow cylinder. One end surface of the hollow cylinder may be connected to one end surface of the coil, and the other end surface of the hollow cylinder may be connected to the panel and/or the housing.

In some embodiments, the connection component may be a group of connecting rods. One end of each connecting rod may be connected to one end surface of the coil, and the other end of each connecting rod may be connected to the panel and/or the housing. Each connecting rod may be distributed circumferentially around the coil.

In some embodiments, the region through which the panel interacting with a user's body may be a plane.

In some embodiments, the region through which the panel interacting with a user's body may be a quasi-plane. The normal line of the region may be an average normal line of the region. The average normal line may be represented by:

$$\hat{r}_0 = \frac{\oiint_S \hat{r} ds}{|\oiint_S \hat{r} ds|},$$

where $\hat{r}_0$ denotes the average normal line, $\hat{r}$ denotes the normal line at any point on the plane, and ds denotes the infinitesimal plane. The quasi-plane may be a plane that the angle between the normal line of a point within at least 50% of the plane and the average normal line is less than a predetermined threshold.

In some embodiments, the predetermined threshold may be less than 10°.

In some embodiments, an area of the panel may be in a range from 20 $mm^2$ to 1000 $mm^2$.

In some embodiments, a length of a side length of the panel may be in a range from 5 mm to 40 mm, or 18 mm to 25 mm, or 11 to 18 mm.

In some embodiments, the axis of the driving device may have a positive direction pointing out of the bone conduction speaker via the panel, the normal line may have a positive direction pointing out of the bone conduction speaker, and an angle between the two lines in the positive direction may be an acute angle.

In some embodiments, an angle between the straight line where the driving force is located and the normal line may be a value between 5° and 80°, or a value between 15° and 70°, or a value between 25° and 50°, or a value between 25° and 40°, or a value between 28° and 35°, or a value between 27° and 32°, or a value between 30° and 35°, or a value between 25° and 60°, or a value between 28° and 50°, or a value between 30° and 39°, or a value between 31° and 38°, or a value between 32° and 37°, or a value between 33° and 36°, or a value between 33° and 35.8°, or a value between 33.5° and 35°.

In some embodiments, the angle between the straight line where the driving force is located and the normal line may be 26°±0.2, 27°±0.2, 28°±0.2, 29°±0.2, 30°±0.2, 31°±0.2, 32°±0.2, 33°±0.2, 34°±0.2, 34.2°±0.2, 35°±0.2, 35.8°±0.2, 36°±0.2, 37°±0.2, or 38°±0.2.

Another embodiment of the present disclosure provides another bone conduction speaker. The bone conduction speaker may include a panel and at least two driving devices. The panel may be transmissibly connected to each of the two driving devices. The panel may be configured to conduct sound. A region through which the panel interacting with the user's body may have a normal line. An axis of the first driving device may be parallel to the normal line, and an axis of the second driving device may be perpendicular to the normal line. The driving device may include a coil and a magnetic system. The axis of the driving device may be perpendicular to a radial plane of the coil and/or a radial plane of the magnetic system.

In some embodiments, the region through which the panel interacting with a user's body may be a plane.

In some embodiments, the region through which the panel interacting with a user's body may be a quasi-plane. The normal line of the region may be an average normal line of the region. The average normal line may be represented by:

$$\hat{r}_0 = \frac{\oiint_S \hat{r} ds}{|\oiint_S \hat{r} ds|},$$

where $\hat{r}_0$ denotes the average normal line, $\hat{r}$ denotes the normal line at any point on the plane, and ds denotes the infinitesimal plane. The quasi-plane may be a plane that the angle between the normal line of a point within at least 50% of the plane and the average normal line is less than a predetermined threshold.

In some embodiments, the predetermined threshold may be less than 10°.

Another embodiment of the present disclosure provides a bone conduction earphone. The bone conduction earphone may include the bone conduction speaker described in any one of the foregoing.

Another embodiment of the present disclosure provides a method for setting a bone conduction speaker. The method may include making a panel transmissibly connected to a driving device. The driving force may be located in a straight line. The panel may be configured to conduct sound. A region through which the panel interacting with the user's body may have a normal line. The method may also include setting a relative position of the driving device and the panel that the straight line is not parallel to the normal line.

In some embodiments, the method may also include setting the relative position of the driving device and the panel that the driving force has a component in at least one of a first quadrant and a third quadrant of an xoy plane coordinate system. An origin o of the xoy plane coordinate system may be located on a contact surface of the bone conduction speaker with the user's body. An x axis may be parallel to a human coronal axis. An y axis may be parallel to a human sagittal axis. A positive direction of the x axis may be toward an outside of the user's body. A positive direction of the y axis may be toward a front of the human body.

In some embodiments, a count of the driving devices may be at least two, and the method may include setting the relative positions of each driving device and the panel that a straight line where a resultant force composed of driving forces generated by each driving device is located is not parallel to the normal line.

In some embodiments, the region through which the panel interacting with a user's body may be a plane.

In some embodiments, the region through which the panel interacting with a user's body may be a quasi-plane. The normal line of the region may be an average normal line of the region. The average normal line may be represented by:

$$\widehat{r}_0 = \frac{\oiint_S \hat{r} ds}{|\oiint_S \hat{r} ds|},$$

where $\widehat{r_0}$ denotes the average normal line, $\hat{r}$ denotes the normal line at any point on the plane, and ds denotes the infinitesimal plane. The quasi-plane may be a plane that the angle between the normal line of a point within at least 50% of the plane and the average normal line is less than a predetermined threshold.

In some embodiments, the predetermined threshold may be less than 10°.

BRIEF DESCRIPTION OF THE DRAWINGS

The present disclosure is further described in accordance with the executive embodiment. These executive embodiments are described in detail with reference to the drawings. These embodiments are non-limiting executive embodiments in which similar reference numbers indicate similar structures in at least two views of the drawings, and wherein.

DETAILED DESCRIPTION

Figure 1:
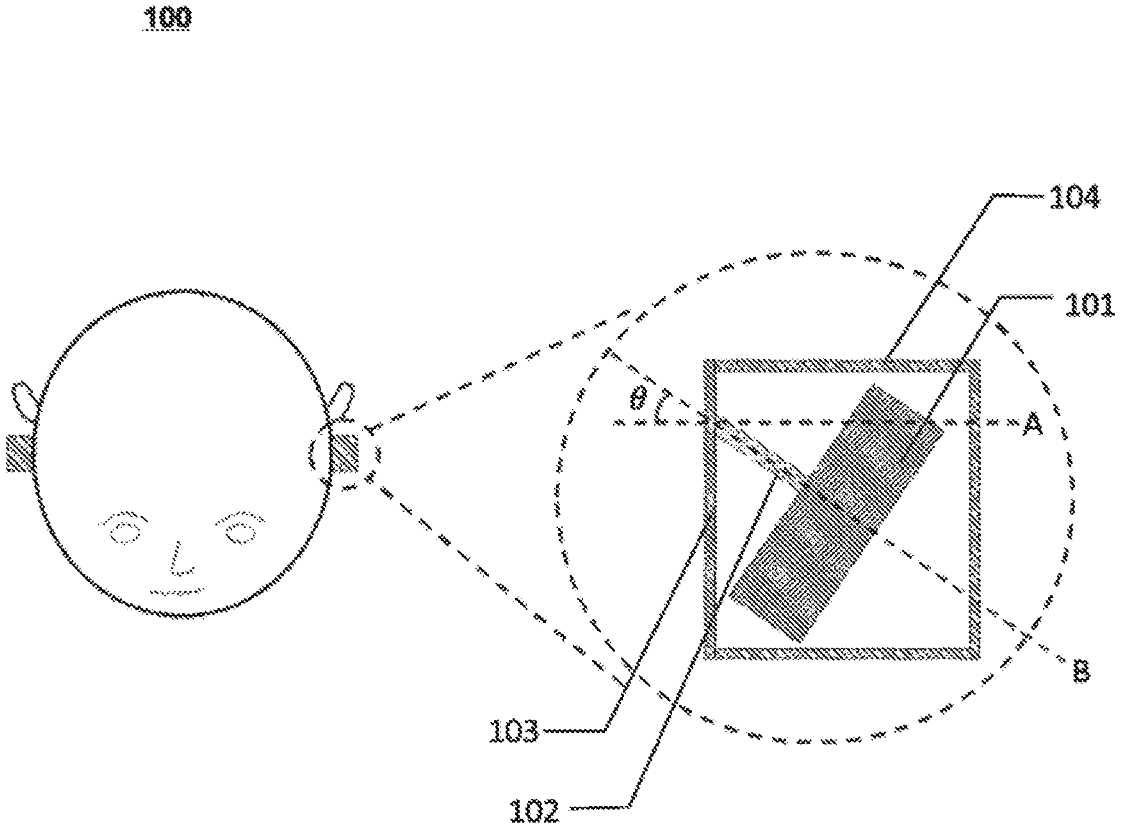
FIG. 1 is a schematic diagram illustrating an application scenario and structure of an exemplary bone conduction speaker according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements. The term "based on" means "based at least in part on." The term "one embodiment" means "at least one embodiment". The term "another embodiment" means "at least one other embodiment". The term "A and/or B" means "at least one of A and B," in other words, "only A, only B, or both A and B." Relevant definitions of other terms will be given in the following description.

In the following, without loss of generality, the description of "bone conduction speaker" or "bone conduction earphone" will be used when describing the bone conduction related technologies in the present disclosure. This description is only a form of bone conduction application. For a person having ordinary skill in the art, "speaker" or "earphone" can also be replaced with other similar words, such as "player", "hearing aid", or the like. In fact, the various implementations of the present disclosure may be easily applied to other non-speaker-type hearing devices. For example, those having ordinary skill in the art, after understanding the basic principles of the bone conduction speaker, may make various modifications and changes in the form and details of the specific methods and steps of implementing bone conduction speaker without departing from this principle. In particular, an ambient sound pickup and processing function may be added to the bone conduction speaker to enable the speaker to implement the function of a hearing aid. For example, microphones may pick up the ambient sound of a user/wearer's and, under a certain algorithm, transmit the processed sound (or generated electrical signal) to the bone conduction speaker section. That is, the bone conduction speaker may be modified to include the function of picking up ambient sound, and transmit the processed sound after a certain signal processing to the user/wearer through the bone conduction speaker part, thereby realizing the function of a bone conduction hearing aid. Merely by way of example, the algorithm mentioned here may include noise cancellation, automatic gain control, acoustic feedback suppression, wide dynamic range compression, active environment recognition, active anti-noise, directional processing, tinnitus processing, multi-channel wide dynamic range compression, active howling suppression, volume control, or the like, or any combination thereof.

A bone conduction speaker transmits sound through the bones to the hearing system, so that people can hear the sound. Generally, the bone conduction speaker generates and conducts sound through the following steps. In step 1, the bone conduction speaker may acquire or generate a signal containing sound information, such as a current signal and/or a voltage signal that contains audio information. In step 2, a driving device, also refers to as a transduction device, of the bone conduction speaker may generate vibration based on the signal. In step 3, a transmission component may transmit the vibration to the panel or housing of the speaker.

In step 1, the bone conduction speaker may acquire or generate a signal containing sound information according to different methods. Sound information may refer to video files or audio files with a specific data format or refer to data or files that can be converted into sound in a specific way. The signal containing the sound information may come from the storage unit of the bone conduction speaker itself, or come from the information generation, storage, or transmission system other than the bone conduction speaker. The sound signal discussed here may not be limited to an electrical signal but may include any other forms, such as an optical signal, a magnetic signal, a mechanical signal, or the like, that contains sound information which can be processed to generate vibration. The sound signal may not be limited to one signal source but may come from a plurality of signal sources. Each of the plurality of signal sources may be related and may not be related to each other. The transmission or generation of the sound signals may be wired or may be wireless, and may be real-time or may be delayed. For example, a bone conduction speaker may receive an electric signal containing sound information through a wired or a wireless connection, or may directly obtain data from a storage medium to generate a sound signal. In some embodiments, a component with a sound collection function may be added to the bone conduction hearing aid, and the ambient sound signal may be received and processed to achieve the effect of reducing noise. A wired connection may include, but not limited to, a metal cable, an optical cable, a metal and optical hybrid cable, or the like. The metal and optical hybrid cable may include a coaxial cable, a communication cable, a flexible cable, a spiral cable, a non-metal sheathed cable, a metal-sheathed cable, a multi-core cable, a twisted-pair cable, a ribbon cable, a shielded cable, a telecommunication cable, a double-stranded cable, a parallel twin-core conductor, or a twisted pair.

The embodiments described above are only for the convenience of explanation. The wired connection medium may also be other types, such as other electrical or optical signal transmission carriers. A wireless connection may include, but not limited to, a radio communication, a free-space optical communication, an acoustic communication, or an electromagnetic induction. The radio communication may include, but not limited to, the IEEE302.11 series of standards, the IEEE302.15 series of standards (such as Bluetooth technology, Zigbee technology, etc.), the first generation mobile communication technology, the second generation mobile communication technology (such as FDMA, TDMA, SDMA, CDMA, SSMA, etc.), the general packet wireless service technology, the third generation mobile communication technology (such as CDMA2000, WCDMA, TD-SCDMA, WiMAX, etc.), the fourth generation mobile communication technology (such as TD-LTE, FDD-LTE, etc.), the satellite communication (such as GPS technology, etc.), the near field communication (NFC), or other technologies operating in the ISM band (such as 2.4 GHz). The free-space optical communication may include, but not limited to, a visible light, an infrared signal, or the like. The acoustic communication may include, but not limited to, an acoustic wave, an ultrasonic signal, or the like. The electromagnetic induction may include, but not limited to, the near field communication technology. The embodiments described above are only for the convenience of explanation. The wireless connection medium may also be other types, such as the Z-wave technology, other charged civilian radio frequency bands, or military radio frequency bands. For example, as some exemplary scenarios of the technology, the bone conduction speaker may obtain signals containing sound information from other devices through Bluetooth technology, or may directly obtain data from the storage unit of the bone conduction speaker, and then generate sound signals.

The storage device/storage unit here refers to a storage device on a storage system including a direct-attached storage, a network-attached storage, and a storage area network. The storage devices may include but not limited to common types of storage devices such as a solid-state storage device (e.g., a solid-state disk, a hybrid hard disk, etc.), a mechanical hard disk, a USB flash memory, a memory stick, a memory card (e.g., CF, SD, etc.), other driver (e.g., CD, DVD, HD DVD, Blu-ray, etc.), a random access memory (RAM), a read-only memory (ROM), or the like. The RAM may include but is not limited to a dekatron, a selectron, a delay line memory, a Williams tubes, a dynamic random access memory (DRAM), a static random access memory (SRAM), a thyristor random access memory (T-RAM), a zero capacitor random access memory (Z-RAM), etc. The ROM may include but is not limited to a bubble memory, a twistor memory, a film memory, a plated wire memory, a magnetic-core memory, a drum memory, a CD-ROM, hard disks, tapes, a non-volatile random access memory (NVRAM), a phase-change memory, a magneto-resistive random access memory, a ferroelectric random access memory, a non-volatile SRAM, a flash memory, an electrically erasable programmable read-only memory, an erasable programmable read-only memory, a programmable read-only memory, a mask ROM, a floating gate random access memory, a Nano random access memory, a racetrack memory, a resistive random access memory, a programmable metallization unit, etc. The storage device/storage unit mentioned above is a list of some examples. The storage device/storage unit may use a storage device that is not limited to this.

FIG. 1 is a schematic diagram illustrating an application scenario and structure of an exemplary bone conduction speaker according to some embodiments of the present disclosure. As shown in FIG. 1, the bone conduction speaker may include a driving device 101, a transmission component 102, a panel 103, a housing 104, or the like. The driving device 101 may transmit a vibration signal to the panel 103 and/or the housing 104 through the transmission component 102, thereby transmitting sound to the human body through contacting the panel 103 or housing 104 with human skin. In some embodiments, the bone 103 and/or housing 104 of the bone conduction speaker may contact with the human skin at the tragus, thereby transmitting sound to the human body. In some embodiments, panel 103 and/or housing 104 may also contact with the human skin on the back side of the auricle.

The bone conduction speaker may convert a signal containing sound information into a vibration and generate sound. The generation of vibration may be accompanied by the conversion of energy. The bone conduction speaker may use a specific driving device to convert the signal to a mechanical vibration. The conversion process may involve the coexistence and conversion of a number of different types of energy. For example, an electrical signal may be directly converted into mechanical vibration through a transducing device to generate sound. For another example, an optical signal may contain the sound information, the driving device may implement the process of converting the optical signal into a vibration signal, or the driving device may first convert the optical signal into an electrical signal, and then convert the electrical signal into a vibration signal. Other types of energy that can coexist and be converted during the operation of the drive device may include thermal energy, magnetic field energy, or the like. The energy conversion methods of the driving device may include, but are not limited to, moving coil, electrostatic, piezoelectric, moving iron, pneumatic, electromagnetic, or the like. The frequency response range and sound quality of the bone conduction speaker may be affected by different transduction methods and the performance of various physical components in the driving device. For example, in a dynamic coil type transducing device, a wound cylindrical coil may be mechanically connected to a vibration transmission sheet, and the coil may be driven by a signal current in a magnetic field to drive the vibration transmission sheet to generate sound. A stretching or contraction of the material, a deformation of the folds, a size, a shape, or a fixing method of the folds of the vibration transmission sheet, and the magnetic density of the permanent magnets may all have a great impact on the final sound quality of the bone conduction speaker. As still another example, the vibration transmission sheet may have a mirror-symmetric structure, a center-symmetric structure, or an asymmetric structure. An intermittent hole-like structure may be provided on the vibration transmission sheet, which may cause greater displacement of the vibration transmission sheet, so that the bone conduction speaker may achieve higher sensitivity and increase the output power of vibration and sound. As another example, the vibration transmission sheet may have a torus structure, and a plurality of struts may be arranged in the torus radiating toward the center.

Obviously, for those skilled in the art, after understanding the basic principles of transduction methods and specific devices that can affect the sound quality of the bone conduction speaker, may make appropriate choices, combinations, corrections or changes to the mentioned influencing factors without departing from this principle, so as to obtain the ideal sound quality. For example, high-density permanent magnets, and more ideal vibration plate materials or design may be used to achieve better sound quality.

The term "sound quality" as used herein may be understood to reflect the quality of the sound, and refers to the fidelity of the audio after processing, transmission or other processes. The sound quality is mainly described by the three elements of loudness, tone and timbre. The loudness refers to the subjective perception of sound strength by the human ear, which may be proportional to the logarithm of sound intensity. The greater the logarithm of sound intensity is, the louder it sounds. The loudness may also be related to the frequency and waveform of the sound. The tone, may also refer to as pitch, refers to the subjective perception of the human ear about the frequency of sound vibrations. The tone may be mainly determined by the fundamental frequency of the sound. The higher the fundamental frequency, the higher the tone. The tone may also be related to the intensity of the sound. The timbre refers to the subjective perception of the human ear about the sound characteristics. The timbre may be mainly determined by the spectral structure of the sound, and may also be related to factors such as the loudness, a duration, an establishment process or a decay process of the sound. The spectral structure of sound may be described by a fundamental frequency, a count of harmonic frequencies, a distribution of harmonic frequencies, a magnitude, and a phase relationship. Different spectrum structures may have different timbre. Even if the fundamental frequencies and loudness of two sounds are the same, if the harmonic structures of the two sounds are different, the timbre may also be different.

As shown in FIG. 1, according to a bone conduction speaker illustrated by some embodiments of the present disclosure, the driving force that generated by the driving device may locate on a straight line B (in other words, the vibration direction of the driving force). The straight line B and the normal line A of panel 103 may form an angle θ. In other words, the line B is not parallel to the line A.

The panel may have regions in contact with or abutting a user's body, such as human skin. It should be understood that when the panel is covered with other materials (e.g., soft materials such as silicone) to enhance the user's wearing comfort, the panel and the user's body may abut each other instead of being in direct contact. In some embodiments, when the bone conduction speaker is worn on the user's body, all regions of the panel may be in contact with or abut the user's body. In some embodiments, when a bone conduction speaker is worn on a user's body, a part of the panel may be in contact with or abut the user's body. In some embodiments, the region of the panel used to contact or abut the user's body may occupy more than 50% of the panel area, and more preferably, may occupy more than 60% of the panel area. In general, the region of the panel where the panel contacting or abutting the user's body may be a plane or a curved surface.

In some embodiments, when the region of the panel where the panel contacting or abutting the user's body is a plane, its normal line may meet the general definition of a normal line. In some embodiments, when the region of the panel where the panel contacting or abutting the user's body is a curved surface, its normal line may be the average normal line of the region.

The average normal line may be defined by the following equation:

$$\hat{r}_0 = \frac{\oiint_s \hat{r}ds}{|\oiint_s \hat{r}ds|}, \tag{1}$$

where $\hat{r}_0$ denotes the average normal line, r denotes the normal line at any point of the surface, ds denotes the infinitesimal plane.

Further, the curved surface may be a quasi-plane close to a plane, that is, a plane that the angle between the normal line of any point within at least 50% of the plane and the average normal line is less than a predetermined threshold. In some embodiments, the threshold may be less than 10°. In some embodiments, the threshold may further be less than 5°.

In some embodiments, the line B where the driving force is located and the normal line A' of the region on the panel 103 for contacting or abutting the user's body may have an angle θ. The value of the angle θ may be in a range from 0° to 180°, and may further be in a range from 0° to 180° but not equal to 90°. In some embodiments, if the straight line B has a positive direction pointing out of the bone conduction speaker, and if the normal line A of the panel 103 (or the normal line A' of the region on the panel 103 for contacting or abutting the user's body) also has a positive direction pointing out of the bone conduction speaker, the angle θ between the straight line A or A' and the straight line B in their positive directions may be an acute angle, that is, $0° < θ < 90°$.

Figure 2:
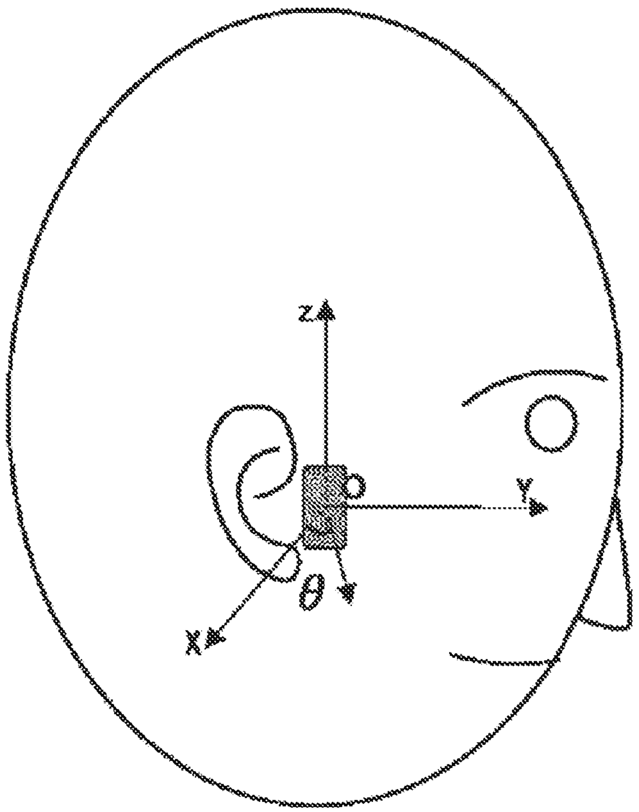
FIG. 2 is a schematic diagram illustrating an exemplary angle direction according to some embodiments of the present disclosure.

FIG. 2 is a schematic diagram illustrating an exemplary angle direction according to some embodiments of the present disclosure. As shown in FIG. 2, in some embodiments, the driving force generated by the driving device may have a component in the first quadrant and/or the third quadrant of the xoy plane coordinate system. The xoy plane coordinate system is a reference coordinate system. The origin o may be located on the contact surface of the panel and/or housing with the human body after the bone conduction speaker is worn on the human body. The x-axis may be parallel to the human coronal axis, and the y-axis may be parallel to the human sagittal axis. A positive direction of the x-axis may be toward the outside of the human body, and a positive direction of the y-axis may be toward the front of the human body. Quadrants should be understood as four regions divided by the horizontal axis (e.g., the x-axis) and the vertical axis (e.g., the y-axis) in the plane rectangular coordinate system. Each region may refer to as a quadrant. Each quadrant may be centered on the origin and the x-axis and the y-axis are the dividing lines. The upper right region (the region enclosed by the positive semi-axis of the x-axis and the positive semi-axis of the y-axis) may refer to as the first quadrant. The upper left (the region enclosed by the negative semi-axis of the x-axis and the positive semi-axis of the y-axis) may refer to as the second quadrant. The lower left (the region enclosed by the negative semi-axis of the x-axis and the negative semi-axis of the y-axis) may refer to as the third quadrant. The lower right (the region enclosed by the positive semi-axis of the x-axis and the negative semi-axis of the y-axis) may refer to as the fourth quadrant. Points on the coordinate axis do not belong to any quadrant. It should be understood that the driving force described here may be directly located in the first quadrant and/or the third quadrant of the xoy plane coordinate system. The driving force may also be toward other directions, wherein the projection or component in the first quadrant and/or the third quadrant of the xoy plane coordinate system is not 0, and the projection or component in the z-axis direction may be or may not be 0. The z-axis may be perpendicular to the xoy plane and pass through the origin o. In some embodiments, the minimum angle θ between the line where the driving force is located and the normal line of the region on the panel for contacting or abutting the user's body may be an arbitrary acute angle. For example, the angle θ may be in a preferable range from 5° to 80°, in a more preferable range from 15° to 70°, still in a more preferable range from 25° to 60°, still in a more preferable range from 25° to 50°, still in a more preferable range from 28° to 50°, still in a more preferable range from 30° to 39°, still in a more preferable range from 31° to 38°, still in a more preferable range from 32° to 37°, still in a more preferable range from 33° to 36°, still in a more preferable range from 33° to 35.8°, and still in a more preferable range from 33.5° to 35°. Specifically, angle θ may be 26°, 27°, 28°, 29°, 30°, 31°, 32°, 33°, 34°, 34.2°, 35°, 35.8°, 36°, 37°, or 38°, etc. The error may be controlled within 0.2 degrees. It should be noted that the description of the direction of the driving force should not be understood as the limitation of the driving force in the present disclosure. In some other embodiments, the driving force may also have components in the second and fourth quadrants of the xoy plane coordinate system, may be located on the y-axis, or the like.

Figure 3:
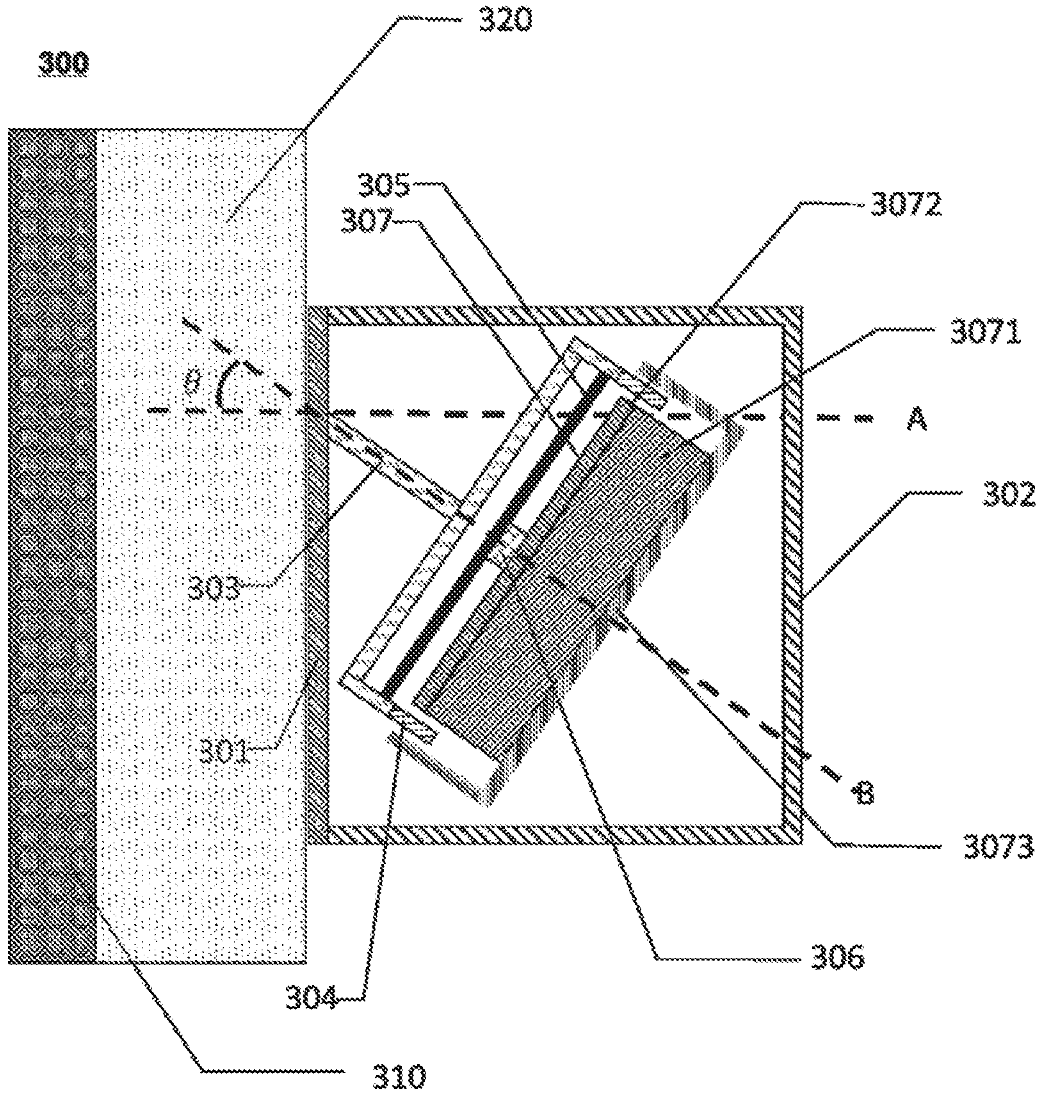
FIG. 3 is a schematic diagram illustrating a structure of an exemplary bone conduction speaker acting on human skin and bones according to some embodiments of the present disclosure.

FIG. 3 is a schematic diagram illustrating a structure of an exemplary bone conduction speaker acting on human skin and bones according to some embodiments of the present disclosure. The bone conduction speaker may receive, pick up, or generate a signal containing sound information, and convert the sound information into a sound vibration through a driving device. The vibration may be transmitted to the human skin 320 in contact with the panel or housing through the transmission component, and the vibration may be further transmitted to the human skeleton 310, such that the user hears the sound. Without loss of generality, the subjects of the hearing system and sensory organs described above may be humans, or animals with hearing systems. It should be noted that the following description of the human use of bone conduction speakers does not constitute a limitation on the use scenario of the bone conduction speaker. Similar descriptions may also be applied to other animals.

As shown in FIG. 3, the bone conduction speaker may include a driving device (also refer to as a transducing device in other embodiments), a transmission component 303, a panel 301, and a housing 302.

The vibration of the panel 301 may be transmitted to the auditory nerve through tissues and bones, so that people hear sound. The panel 301 may be in direct contact with the human skin, or may be in contact with the human skin through a vibration transmission layer composed of a specific material. The region where the panel 301 contacts with the human body may be near the tragus, the mastoid, behind the ear, or other locations.

The physical properties of the panel, such as mass, size, shape, stiffness, vibration damping, or the like, may all affect the vibration efficiency of the panel. Those skilled in the art may select panels made of appropriate materials according to actual needs, or use different molds to inject the panels into different shapes. For example, the shape of the panel may be a rectangle, a circle, or an ellipse. As another example, the shape of the panel may be a shape obtained by cutting an edge of a rectangle, a circle, or an ellipse (such as, but not limited to, cutting a circle symmetrically to obtain a shape similar to an ellipse or a racetrack, etc.). Further preferably, the panel may be hollow. Merely by way of example, an area size of the panel may be set as required. In some embodiments, the area size of the panel may be in a range from 20 $mm^2$ to 1000 $mm^2$. Specifically, a side length of the panel may be in a range from 5 mm to 40 mm, or 18 mm to 25 mm, or 11 to 18 mm. For example, the panel may be a rectangle with a length of 22 mm and a width of 14 mm. As another example, the panel may be an ellipse with a long axis of 25 mm and a short axis of 15 mm.

The panel materials mentioned here may include, but are not limited to, steel, alloys, plastics, and single or composite materials. The steel may include but is not limited to stainless steel, carbon steel, or the like. The alloys may include, but are not limited to, aluminum alloys, chromium-molybdenum steels, rhenium alloys, magnesium alloys, titanium alloys, magnesium-lithium alloys, nickel alloys, or the like. The plastics may include, but are not limited to, acrylonitrile butadiene styrene (ABS), polystyrene (PS), high impact polystyrene (HIPS), polypropylene (PP), polyethylene terephthalate (PET), polyester (PES), polycarbonate (PC), polyamides (PA), polyvinyl chloride (PVC), polyethylene, blown nylon, etc. The single or composite materials may include, but ae not limited to glass fiber, carbon fiber, boron fiber, graphite fiber, graphene fiber, silicon carbide fiber, aramid fiber, or other reinforcing materials. The single or composite material may also include a composite of other organic and/or inorganic materials, such as glass fiber reinforced unsaturated polyester, various types of glass steel composed of epoxy resin or phenolic resin matrix, or the like.

In some other embodiments, the outer side of the panel of the bone conduction speaker may be wrapped with a vibration transmission layer being in contact with the skin. The vibration system composed of the panel and the vibration transmission layer may transmit the generated sound vibration to the human tissue. The vibration transmission layer may include a plurality of layers. The vibration transmission layer may be made of one or more materials, and the materials of different vibration transmission layers may be the same or different. The plurality of vibration transmission layers may be superimposed in a vertical direction of the panel, be arranged in a horizontal direction of the panel, or be superimposed at an angle with the panel. The angle between each layer and the panel may be the same or different, or any combination thereof. The vibration transmission layer may be composed of a material with a certain adsorption, flexibility, and chemical properties, such as plastics (such as but not limited to high-molecular polyethylene, blown nylon, engineering plastics, etc.), rubber, or other single or composite materials that can achieve the same performance.

In some embodiments, when the bone conduction speaker is worn on the user's body, all regions of the panel may be in contact with or abut the user's body. In some embodiments, when a bone conduction speaker is worn on a user's body, a part of the panel may be in contact with or abut the user's body. In some embodiments, the region of the panel used to contact or abut the user's body may occupy more than 50% of the panel area, and more preferably, may occupy more than 60% of the panel area. In general, the skin of the user is relatively flat. When the region where the panel is in contact with the skin is set to a plane or a quasi-plane without large fluctuations, the region where the panel is in contact with the skin is larger, thereby making the volume louder. For example, the panel may have a composite structure with a plane in the middle and an arc chamfer at the edges. As such, the panel may fully contact with the human skin and have a curved surface to ensure the suitability of different people.

In some embodiments, the panel 301 may cooperate with the housing 302 to form a closed or quasi-closed cavity (e.g., a hole in the panel or housing) to accommodate the driving device. Specifically, the panel 301 and the housing 302 may be integrally formed, that is, the panel and the housing may be made of the same material, and there is no demarcation between the two in structure. The panel 301 may also be mechanically connected to the housing 302 by snapping, riveting, hot-melt, or welding. In some other embodiments, the panel 301 and the housing 302 may be mechanically connected through a connection medium. The connection medium may include an adhesive such as polyurethane, polystyrene, polyacrylate, ethylene-vinyl acetate copolymer, shellac, butyl rubber, or the like. The connection medium may also include connection parts with specific structures, such as a vibration transmission sheet, a connecting rod, or the like. The stiffness of the housing, the stiffness of the panel, and the stiffness of the connection between the housing and the panel may all affect the frequency response of the speaker. In some embodiments, both the housing and the panel may be made of materials with greater stiffness, while the stiffness of the connection medium between the housing and the panel is relatively smaller. When the driving device vibrates, the panel and the housing may vibrate asynchronously. In some other embodiments, both the housing and the panel may be made of materials with greater stiffness, and the stiffness of the connection medium between the housing and the panel is also greater, which may result in an increased overall stiffness of the vibration system, and the resonance part may contain more high-frequency components. In some embodiments, the stiffness of the panel and the housing may be increased by adjusting the stiffness of the panel and the housing, and the peaks and valleys of the high frequency region may be adjusted to a higher frequency band region. More descriptions about the relationship between component stiffness and sound quality may be found elsewhere in the present disclosure (see, e.g., FIG. 7 and the descriptions thereof).

In some embodiments, the housing may have greater stiffness and lighter weight, and may be mechanically vibrated as a whole. The housing may ensure the consistency of vibrations, form mutually canceled leaks, ensure good sound quality, and high volume. In some embodiments, the housing may have or may not have holes. For example, a hole in the housing may be configured to adjust the leakage of the bone conduction speaker.

The stiffness may be understood as the ability of a material or structure to resist elastic deformation when subjected to a force, which may be related to the elastic modulus, shape, structure, or installation method of the material of the component. For example, the stiffness of a component is positively related to the elastic modulus and thickness of the component, and negatively related to the surface area of the component. In some embodiments, the component may be a panel, a housing, a transmission component, or the like. Specifically, the stiffness of a sheet-like component such as a panel may be expressed by the following expression:

$$k \propto \frac{E \cdot h^3}{d^2}, \tag{2}$$

where k denotes the panel stiffness, E denotes the panel elastic modulus, h denotes the thickness of the panel, and d denotes the radius of the panel. It can be seen that the smaller the radius, the thicker the thickness, and the larger the elastic modulus of the panel, the greater the stiffness of the corresponding panel. In some other embodiments, the stiffness of a rod-shaped or strip-shaped transmission component may be expressed by the following expression:

$$k \propto \frac{E \cdot h^3 \cdot w}{l^3}, \tag{3}$$

where k denotes the stiffness of the transmission component, E denotes the elastic modulus of the transmission component, h denotes the thickness of the transmission component, w denotes the width of the transmission component, and l denotes the length of the transmission component. It can be seen that the smaller the transmission component, the thicker the thickness, the larger the width, and the larger the elastic modulus, the greater the stiffness of the corresponding transmission component.

In some embodiments, the driving device may be located in a closed or quasi-closed space formed by the panel and the housing (e.g., with holes in the panel or housing). In some other embodiments, the driving device may be located in a closed or quasi-closed space formed by the housing, and the panel is provided independently from the housing. More descriptions about the separately setting of the panel and the housing may be found elsewhere in the present disclosure (see, e.g., FIG. 15 and the descriptions thereof). The driving device may be configured to convert electrical signals into vibrations with different frequencies and amplitudes. The working modes of the driving device may include, but are not limited to, moving coil, moving iron, piezoelectric ceramics, or other working methods.

Merely by way of example, the following descriptions may take the moving coil method as an example. In FIG. 3, the driving device may be a moving coil driving method, and may include a coil 304 and a magnetic system 307.

The magnetic system 307 may include a first magnetic component 3071, a first magnetic conductive component 3072, and a second magnetic conductive component 3073. The magnetic component described in the present disclosure refers to a component that may generate a magnetic field, such as a magnet. The magnetic component may have a magnetization direction, and the magnetization direction refers to a direction of a magnetic field within the magnetic component. The first magnetic component 3071 may include one or more magnets. In some embodiments, the magnet may include a metal alloy magnet, a ferrite, or the like. The metal alloy magnet may include neodymium iron boron, samarium cobalt, aluminum nickel cobalt, iron chromium cobalt, aluminum iron boron, iron carbon aluminum, or the like, or any combination thereof. The ferrite may include a barium ferrite, a steel ferrite, a manganese ferrite, a lithium manganese ferrite, or the like, or any combination thereof.

The magnetic conductive component may also refer to as a magnetic field concentrator or an iron core, which may adjust the distribution of the magnetic field (e.g., the magnetic field generated by the first magnetic component 3071). In some embodiments, a lower surface of the first magnetic conductive component 3072 may be mechanically connected to an upper surface of the first magnetic component 3071. The second magnetic conductive component 3073 may have a concave structure, which may include a bottom wall and a sidewall. The inside of the bottom wall of the second magnetic conductive component 3073 may be mechanically connected to the first magnetic component 3071, and the side wall may surround the first magnetic component 3071 and form a magnetic gap with the first magnetic component 3071. A mechanical connection between the first magnetic conductive component 3072, the second magnetic conductive component 3073, and the first magnetic component 3071 may include a bonded connection, a locking connection, a welded connection, a rivet connection, a bolted connection, or the like, or any combination thereof.

The magnetic conductive component may include an element manufactured from a soft magnetic material. In some embodiments, exemplary soft magnetic material may include a metal material, a metal alloy material, a metal oxide material, an amorphous metal material, or the like. For example, the soft magnetic material may include iron, iron-silicon based alloy, iron-aluminum based alloy, nickel-iron based alloy, iron-cobalt based alloy, low carbon steel, silicon steel sheet, silicon steel sheet, ferrite, or the like. In some embodiments, the magnet may be manufactured by, for example, casting, plastic processing, cutting processing, powder metallurgy, or the like, or any combination thereof. The casting may include sand casting, investment casting, pressure casting, centrifugal casting, or the like. The plastic processing may include rolling, casting, forging, stamping, extrusion, drawing, or the like, or any combination thereof. The cutting processing may include turning, milling, planning, grinding, or the like. In some embodiments, the magnetic conductive component may be manufactured by a 3D printing technique, a computer numerical control machine tool, or the like.

It should be understood that the description of the construction of driving devices should not be taken as a limitation of the present disclosure. In some embodiments, the magnetic system may include a plurality of magnetic components, which may be stacked together from top to bottom. An additional magnetic conductive component may be set between the adjacent magnetic components, and another magnetic conductive component may be set on the top surface of the top magnetic component. The magnetic component may be a component configured to generate a magnetic field. The magnetic conductive component may be configured to adjust the distribution of the magnetic field. A structure of the magnetic system set according to the specific magnetic field distribution requirements may be used for the bone conduction speaker and without limitation in the present disclosure.

The coil 304 may be disposed within a magnetic gap between the first magnetic component 3071 and the second magnetic conductive component 3073. After electrifying, the coil 304 located within the magnetic gap may be driven to vibrate by an ampere force (i.e., driving force). The magnetic system 307 may generate vibration under the action of a reaction force. The driving device may further include a transmission component 303 for transmitting vibrations of the coil 304 and/or the magnetic system 307 to the panel and/or the housing. The ampere force may be a force that the conducting wire receives in the magnetic field. The direction of the ampere force may be perpendicular to the plane determined by the direction of the conducting wire and the magnetic field, and may be determined by the left-hand rule. When the current direction and the magnetic field direction change, the direction of the ampere force may also change. In some embodiments, the magnetic field generated by the magnetic system is static. When the current direction changes, the direction of the driving force may switch its direction along a straight line. The straight line may be considered as the line in which the driving force is located. The coil may generate vibration by the driving force, and the magnetic system may also generate vibration due to the reaction force. The vibration of the two may be generally along the same straight line, but the directions are opposite. The straight line may be regarded as a straight line where the vibration is located, and may be the equivalent (that is, parallel) to or the same as the straight line where the driving force is located.

In some embodiments, the vibration of the coil may be transmitted to the panel and/or the housing through a first transmission component, and the vibration of the magnetic system may be transmitted to the panel and/or the housing through a second transmission component.

In some embodiments, after electrifying, the coil may generate vibration under the effect of the ampere force. The vibration of the coil may be transmitted to the panel and/or the housing through the first transmission component, and the coil may interact with the magnetic system through the magnetic field. The reaction force received by the magnetic system may also generate vibration, and the vibration of the magnetic system may be transmitted to the panel and/or the housing through the second transmission component. In some embodiments, the transmission component may include a connecting rod, a connecting post, and/or a vibration transmission sheet. In some embodiments, the transmission component may have a moderate elastic force to cause a damping effect in the process of transmitting vibration, which may reduce the vibration energy transmitted to the housing, thereby effectively suppressing the leakage of the bone conduction speaker to the outside caused by the housing vibration, avoiding the occurrence of abnormal sounds caused by possible abnormal resonances, and achieving the effect of improving sound quality. The positions where the transmission component located in/on the housing may also have different degrees of influence on the transmission efficiency of vibration. In some embodiments, the transmission component may make the driving device in different states, such as being hanged or being supported. The vibration transmission sheet may be a shrapnel with a small thickness. The main body of a specific vibration transmission sheet may be a ring structure, and a plurality of branches or a plurality of connecting pieces that are radiated toward the center may be provided in the ring body structure. The count of the branches or the connecting pieces may be two or more. More descriptions about the transmission components may be found elsewhere in the present disclosure (see, e.g., the specific embodiment section).

In some embodiments, the straight line where the driving force is located may be collinear or parallel to the straight line where the driving device vibrates. For example, in a driving device with a moving coil principle, the direction of the driving force may be the same as or opposite to the vibration direction of the coil and/or magnetic system. The panel may be a plane or a curved surface, or the panel may have several protrusions or grooves. In some embodiments, when the bone conduction speaker is worn on the user's body, the normal line of the region on the panel for contacting or abutting the user's body is not parallel to the line where the driving force is located. Generally speaking, the region on the panel for contacting or abutting the user's body is relatively flat, and more particularly, may be a plane, or a quasi-plane with little change in curvature. When the region on the panel for contacting or abutting the user's body is a plane, the normal line at any point on the panel may be the normal line of the region. When the region on the panel for contacting or abutting the user's body is not a plane, the normal line of the region may be an average normal line. More descriptions about the average normal line may be found elsewhere in the present disclosure (see, e.g., FIG. 1 and the descriptions thereof). In some embodiments, when the region on the panel for contacting or abutting the user's body is not a plane, the normal line of the region may be determined as follows. A point in a region where the panel is in contact with human skin may be selected, a tangent plane of the panel at the point may be determined, and then a line passing through the point and being perpendicular to the tangent plane may be determined. The straight line may be taken as the normal line of the panel. According to a specific embodiment of the present disclosure, the straight line on which the driving force is located (or the straight line on which the driving device vibrates) may have an angle θ with the normal line of the region, and the angle $0° < \theta < 180°$. In some embodiments, the line on which the driving force is located may have a positive direction pointing out the bone conduction speaker via the panel (or the surface where the panel and/or the housing in contact with the human skin), and the normal line of the specified panel (or the surface where the panel and/or the housing in contact with the human skin) may have a positive direction pointing out of the bone conduction speaker, the angle between the two lines in the positive direction may be an acute angle.

In some embodiments, the bone conduction speaker 300 may include a panel 301, a housing 302, a first transmission component 303, a coil 304, a vibration transmission sheet 305, a second transmission component 306, and a magnetic system 307. The vibrations of the coil 304 and the magnetic system 307 may be transmitted to the panel 301 and/or the housing 302 via different routes. For example, the vibration of the coil 304 may be transmitted to the panel 301 and/or the housing 302 through a first transmission path, and the vibration of the magnetic system 307 may be transmitted to the panel 301 and/or the housing 302 through a second transmission path. The first transmission path may include a first transmission component 303, and the second transmission path may include a second transmission component 306, a vibration transmission sheet 305, and the first transmission component 303. Specifically, a part of the first transmission component 303 may be a structure with a flange. The flange may be a ring shape adapted to the structure of the coil 304, and be mechanically connected to one end surface of the coin 304. The other part of the first transmission component 303 may be a connecting rod, and the connecting rod may be mechanically connected to the panel and/or the housing. The coil 304 may be wholly or partially sleeved on the magnetic gap of the magnetic system 307. In the second transmission path, the second transmission component 306 may be mechanically connected to the magnetic system 307 and the vibration transmission sheet 305. The edge of the vibration transmission sheet 305 may be fixed on the flange of the first transmission component 303. The center of the vibration transmission sheet 305 may be mechanically connected to one end of the second transmission component 306. The edge of the vibration transmission sheet 305 may be mechanically connected to the inner side of the flange of the first transmission component 303, and the connection may include a snap-fitting connection, a hot-pressing connection, a rivet connection, a bonded connection, an injection molding connection, or the like. It should be noted that the first transmission path and the second transmission path may also have other structures, and this embodiment should not be taken as a limitation of the transmission component. More descriptions about the transmission component may be found elsewhere in the present disclosure.

In some embodiments, both the coil 304 and the magnetic system 307 may have ring structures. In some embodiments, the coil 304 and the magnetic system 307 may have mutually parallel axis, and the axis of the coil 304 or the magnetic system 307 may be perpendicular to the radial plane of the coil 304 and/or the radial plane of the magnetic system 307. In some embodiments, the coil 304 and the magnetic system 307 may have the same central axis. The central axis of the coil 304 may be perpendicular to the radial plane of the coil 304 and pass through the geometric center of the coil 304. The central axis of the magnetic system 307 may be perpendicular to the radial plane of magnetic system 307 and pass through the geometric center of the magnetic system 307. The axis of the coil 304 or the magnetic system 307 and the normal line of the panel 301 may have the aforementioned angle θ.

In this embodiment, after electrifying, the coil 304 may generate ampere force and vibration in the magnetic field generated by the magnetic system 307, and transmit the vibration of the coil 304 to the panel 301 through the first transmission component 303. The vibration generated by the reaction force received by the magnetic system 307 may be transmitted to the panel 301 through the second transmission component 306, the vibration transmission sheet 305, and the first transmission component 303. The vibration of the coil 304 and the vibration of the magnetic system 307 may be transmitted to the skin and bones of the human body through the panel 301, so that people can hear sound. In short, the vibration generated by the coil 304 and the vibration generated by the magnetic system 307 may form a composite vibration, which may be transmitted to the panel 301. The composite vibration may be transmitted to the skin and bones of the human body through the panel 301, so that people can hear bone conduction sound.

Merely by way of example, in connection with FIG. 3, the relationship between the driving force F and the skin deformation S may be explained. When the driving force generated by the driving device is parallel to the normal line of the panel 301 (i.e., the angle θ is zero), the relationship between the driving force and the total skin deformation may be expressed as equation:

$$F_{\perp} = S_{\perp} \times E \times A / h, \tag{4}$$

where $F_{\perp}$ denotes the driving force, $S_{\perp}$ denotes the total deformation of the skin in the vertical skin direction, E denotes the elastic modulus of the skin, A denotes the contact area of the panel with the skin, and h denotes the total thickness of the skin (i.e., the distance between the panel and the bone).

When the driving force of the driving device is perpendicular to the normal line of the region on the panel for contacting or abutting the user's body (i.e., the angle θ is 90 degrees), the relationship between the driving force in the vertical direction and the total skin deformation may be shown in equation:

$$F_{//} = S_{//} \times G \times A / h, \tag{5}$$

where $F_{//}$ denotes the driving force, $S_{//}$ denotes the total deformation of the skin in the direction parallel to the skin, G denotes the shear modulus of the skin, A denotes the contact area of the panel with the skin, and h denotes the total thickness of the skin (i.e., the distance between the panel and the bone). The relationship between the shear modulus G and the elastic modulus E may be shown in equation:

$$G = E / 2(1 + \gamma), \tag{6}$$

where γ denotes the Poisson's ratio of the skin, and $0<\gamma<0.5$, so the shear modulus G is less than the elastic modulus E, and the corresponding total deformation of the skin under the same driving force $S_{//}>S_{\perp}$. Usually, the Poisson's ratio of the skin is close to 0.4.

When the driving force of the driving device is not parallel to the normal line of the region on the panel for contacting or abutting the user's body, the horizontal driving force and the vertical driving force may be expressed as the following equations (7) and (8):

$$F\perp = F \times \cos(\theta), \tag{7}$$

$$F_{//} = F \times \sin(\theta). \tag{8}$$

The relationship between the driving force F and the skin deformation S may be expressed as the following equation (9):

$$S = \sqrt[2]{S_{\perp}^2 + S_{//}^2} = \frac{h}{A} \times F \times \sqrt[2]{(\cos(\theta)/E)^2 + (\sin(\theta)/G)^2}. \tag{9}$$

Figure 4:
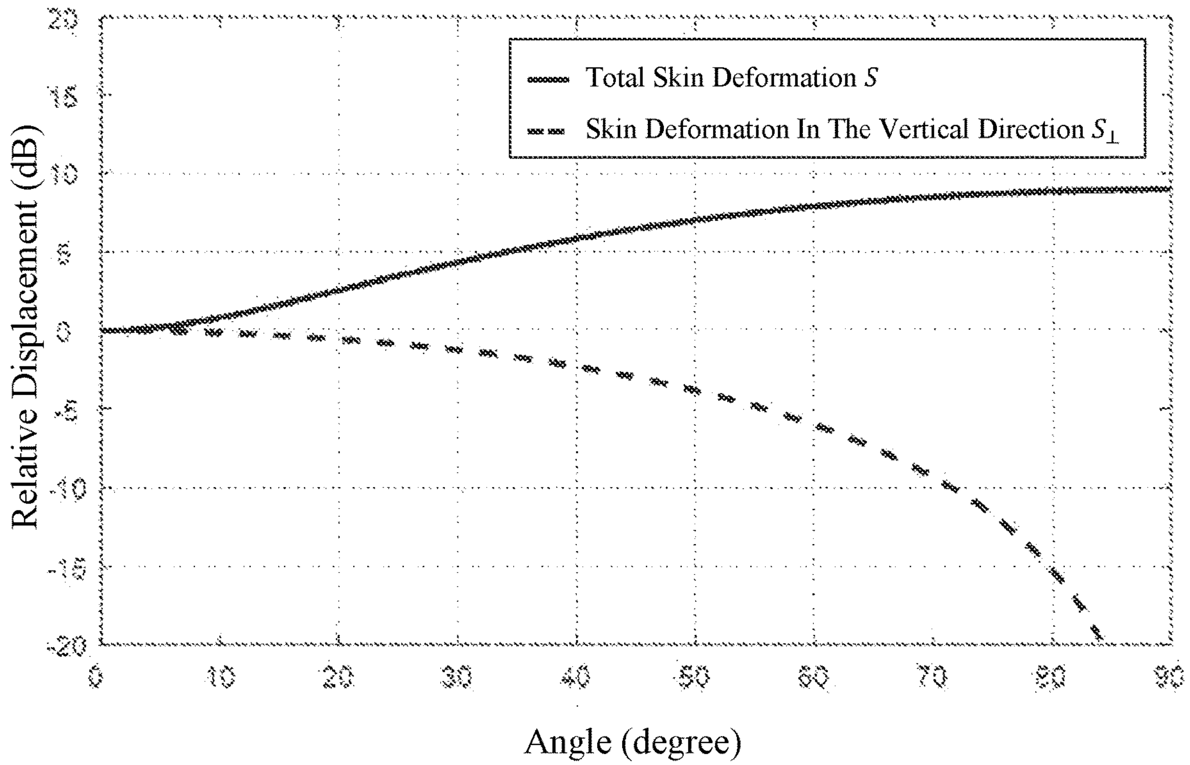
FIG. 4 is a schematic diagram illustrating an angle-relative displacement relationship of an exemplary bone conduction speaker according to some embodiments of the present disclosure.

When the Poisson's ratio of the skin is 0.4, a detailed description of the relationship between the angle θ and the total skin deformation may be found in FIG. 4.

FIG. 4 is a schematic diagram illustrating an angle-relative displacement relationship of an exemplary bone conduction speaker according to some embodiments of the present disclosure. As shown in FIG. 4, the relationship between the angle θ and the total skin deformation may be that the larger the angle θ and the larger the relative displacement, the larger the total skin deformation S. As the angle θ becomes larger, the relative displacement becomes smaller and the deformation of the skin in the vertical skin direction $S_{\perp}$ becomes smaller too. And when the angle θ is close to 90 degrees, the skin deformation in the vertical direction $S_{\perp}$ gradually approaches 0.

The volume of bone conduction earphones in the low-frequency part may be positively related to the total skin deformation S. The greater the S, the greater the volume of the low-frequency part of bone conduction. The volume of bone conduction earphones in the high-frequency part may be positively related to the skin deformation in the vertical direction $S_{\perp}$. The larger the $S_{\perp}$, the greater the volume of the low-frequency part of bone conduction.

When the Poisson's ratio of the skin is 0.4, the detailed description of the relationship between the angle θ and the total skin deformation S, and the skin deformation in the vertical direction $S_{\perp}$ may be found in FIG. 4. As shown in FIG. 4, the relationship between the angle θ and the total skin deformation S may be that the greater the angle θ, the greater the total skin deformation S, and the greater the volume of the low-frequency part of the corresponding bone conduction earphone. As shown in FIG. 4, the relationship between angle θ and the skin deformation in the vertical direction $S_{\perp}$ may be that the larger the angle θ, the smaller the skin deformation in the vertical direction $S_{\perp}$, and the smaller the volume of the high-frequency part of the corresponding bone conduction earphones.

It can be seen from the curve of equation (8) and FIG. 4 that as the angle θ increases, the speed at which the total skin deformation S increases is different from the speed at which the skin deformation in the vertical direction $S_{\perp}$. The total skin deformation S increases faster and then slows down, and the skin deformation in the vertical direction $S_{\perp}$ decreases faster and faster. In order to balance the low-frequency and high-frequency volume of bone conduction earphones, the angle θ should be at a suitable size. For example, the range of 0 may be in a range from 5° to 80°, 15° to 70°, 25° to 50°, 25° to 35°, 25° to 30% or the like.

Figure 5:
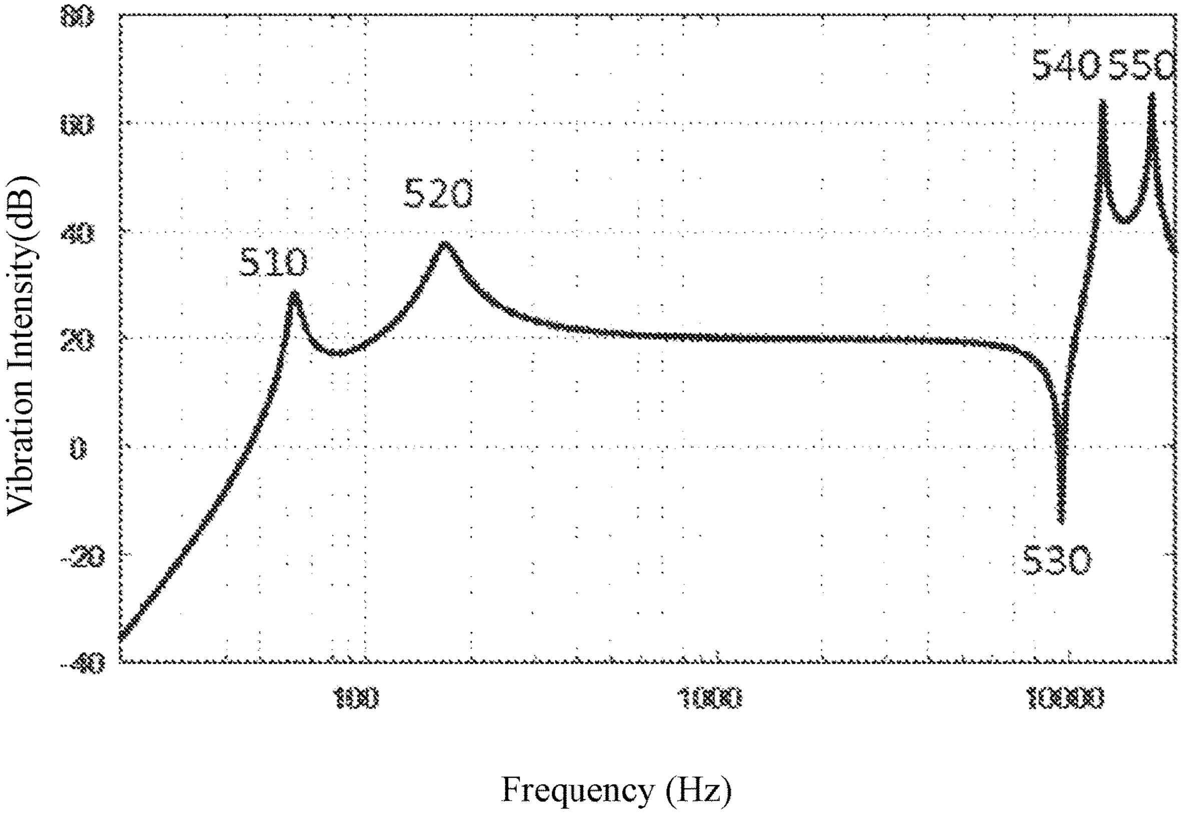
FIG. 5 is a schematic diagram illustrating a frequency response curve of an exemplary bone conduction speaker according to some embodiments of the present disclosure.

FIG. 5 is a schematic diagram illustrating a frequency response curve of an exemplary bone conduction speaker according to some embodiments of the present disclosure. As shown in FIG. 5, the horizontal axis denotes the vibration frequency, and the vertical axis denotes the vibration intensity of the bone conduction earphone. In some embodiments, in the range of frequencies from 500 to 6000 Hz, the flatter the frequency response curve is, the better the sound quality of the bone-conducting earphones is considered. The structure, design of parts, and material properties of bone conduction earphones may have an impact on the frequency response curve. Generally, low frequencies refer to sounds that than 500 Hz, intermediate frequencies refer to sounds in the range from 500 Hz to 4000 Hz, and high frequencies refer to sounds greater than 4000 Hz. As shown in FIG. 5, the frequency response curve of bone conduction earphones may have two resonance peaks (510 and 520) in the low-frequency range, a first high-frequency valley 530, a first high-frequency peak 540, and a second high-frequency peak 550 in the high-frequency range. The two resonance peaks (510 and 520) in the low-frequency range may be generated by the combined action of a vibration transmission sheet and an earphone fixing component. The first high-frequency valley 530 and the first high-frequency peak 540 may be generated by the deformation of the housing side at high frequency, and the second high-frequency peak 550 may be generated by the deformation of the shell panel at high frequency.

The positions of the different resonance peaks and high-frequency peaks/valleys may be related to the stiffness of the corresponding components. The stiffness is generally referred to as the degree of softness and stiffness, and is the ability of a material or structure to resist elastic deformation when subjected to a force. The stiffness is related to the Young's modulus and structural dimensions of the material itself. The greater the stiffness, the smaller the deformation of the structure when subjected to a force. As mentioned above, the frequency response from 500 to 6000 Hz is especially critical for bone conduction earphones. In this frequency range, sharp peaks and valleys are not expected. The flatter the frequency response curve, the better the sound quality of the earphones. In some embodiments, the peak and valley of the high-frequency range may be adjusted to a higher frequency range by adjusting the stiffness of the shell panel and the shell back panel.

Figure 6:
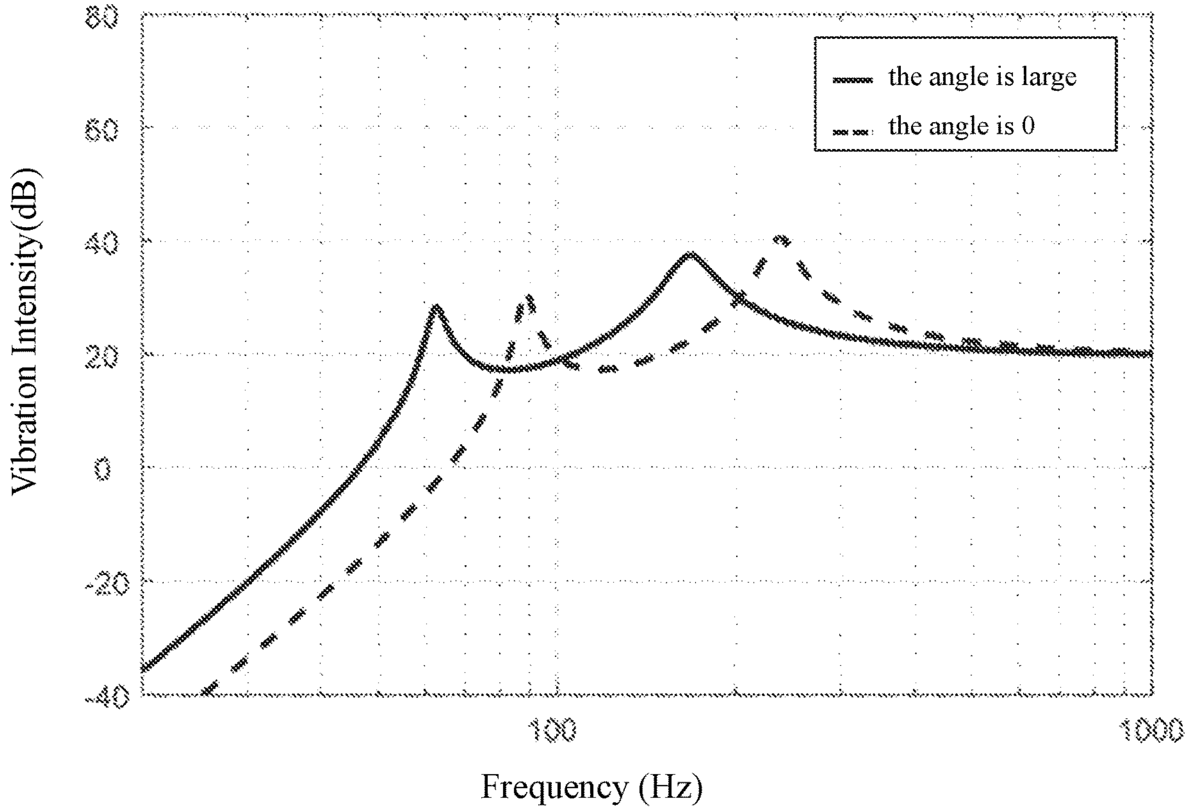
FIG. 6 is a schematic diagram illustrating a low-frequency part of a frequency response curve of an exemplary bone conduction speaker at different angles θ according to some embodiments of the present disclosure.

FIG. 6 is a schematic diagram illustrating a low-frequency part of a frequency response curve of an exemplary bone conduction speaker at different angles θ according to some embodiments of the present disclosure. As shown in FIG. 6, the panel may be in contact with the skin and transmit vibration to the skin. In this process, the skin may also affect the vibration of the bone conduction speaker, which may affect the frequency response curve of the bone conduction speaker. From the above analysis, we found that the greater the angle, the greater the total deformation of the skin under the same driving force, and corresponding to the bone conduction speaker, it is equivalent to reduced elasticity of the skin relative to the panel. It may be further understood that when the line where the driving force of the driving device is located and the normal line of the region on the panel for contacting or abutting the user's body may form a certain angle θ. In particular, when the angle θ is increased, the resonance peak of the low-frequency range in the frequency response curve may be adjusted to a lower frequency range, so that the low frequency dives deeper and the low-frequency portion increases. Compared with other technical means to improve the low-frequency portion in the sound, such as adding a vibration transmission sheet to the bone conduction speaker, setting the angle can effectively suppress the increase in vibration while increasing the low-frequency energy, thereby reducing the vibration sensation relatively, so that the low-frequency sensitivity of the bone conduction speaker is significantly improved, and the sound quality and the human experience are improved. It should be noted that, in some embodiments, the increase in low frequency range and less vibration can be expressed as the angle θ increases in the range from 0° to 90°, the energy in the low frequency range of the vibration or sound signal increases, and the vibration sense increases. However, the increase of the energy in the low frequency range may be greater than the increase of the vibration, so the relative effect is relatively reduced.

It may be seen from FIG. 6 that when the angle is relatively large, the resonance peak of the low-frequency range appears at a lower frequency range, and the flat part of the frequency curvature may be prolonged, thereby improving the sound quality of the earphones.

Figure 7:
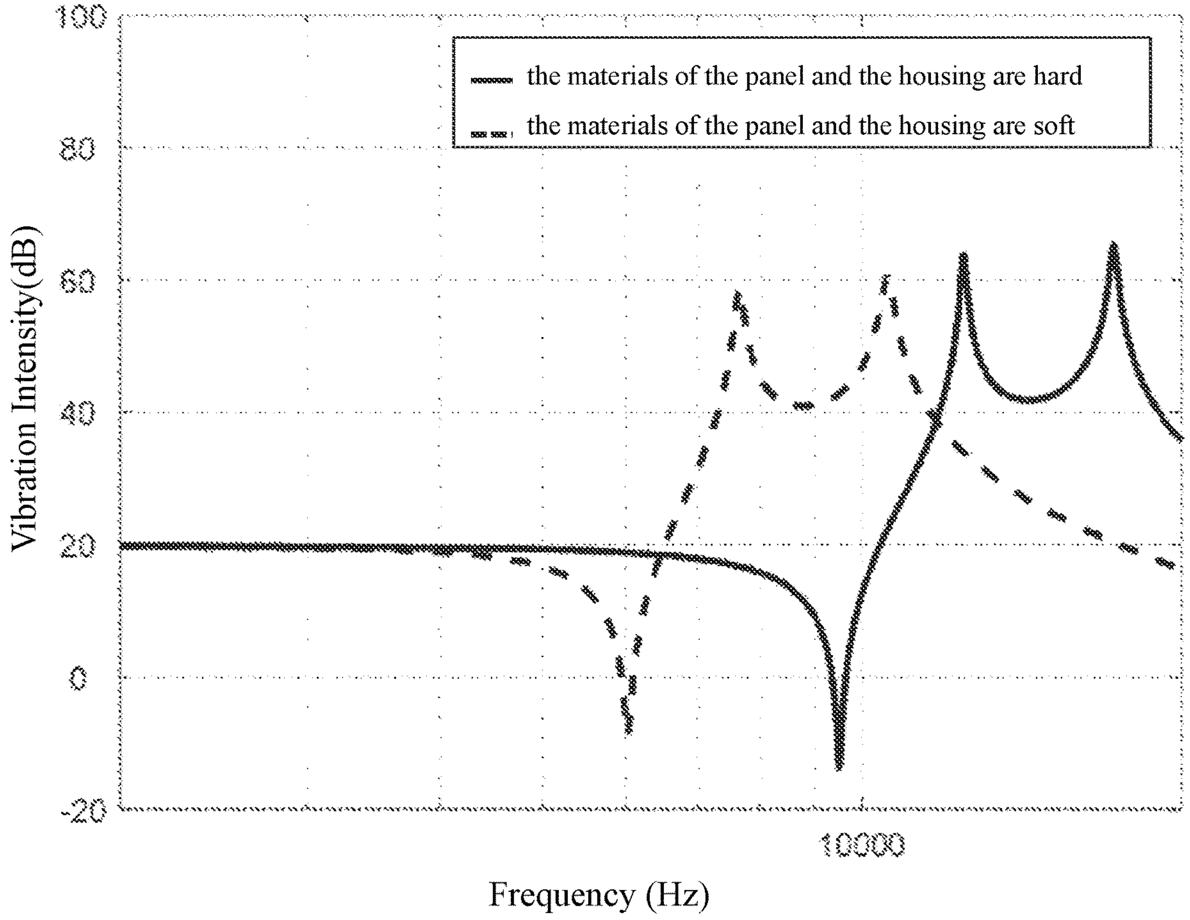
FIG. 7 is a schematic diagram illustrating a high-frequency part of a frequency response curve of an exemplary bone conduction speaker with different panel and housing materials according to some embodiments of the present disclosure.

FIG. 7 is a schematic diagram illustrating a high-frequency part of a frequency response curve of an exemplary bone conduction speaker with different panel and housing materials according to some embodiments of the present disclosure. As shown in FIG. 7, when the materials of the panel and the housing are harder, the frequencies corresponding to the first high-frequency peak and the second high-frequency peak are higher. When the materials of the panel and the housing are softer, the frequencies corresponding to the first high-frequency peak and the second high-frequency peak are lower. When the materials of the panel and the housing are hard, the frequency corresponding to the first high-frequency valley is higher. When the materials of the panel and the housing are soft, the frequency corresponding to the first high-frequency valley is lower than that with the materials of the panel and the housing hard. It may be found that the rigid (harder) materials of the panel and the housing may increase the corresponding frequency value when high-frequency peaks/valleys appear. According to the description of FIG. 5, it can be known that the frequency response from 1000 to 10000 Hz is particularly critical for bone conduction earphones. In this frequency range, sharp peaks and valleys are not expected. The flatter the frequency response curve, the better the sound quality of the earphones. The rigid (harder) materials of the panel and the housing in FIG. 7 may prolong the flat portion of the frequency curvature, thereby improving the sound quality of the earphones.

In some embodiments, the stiffness of different components (e.g., the housing, the transmission component, the driving device, etc.) may be related to the Young's modulus, thickness, size, or the like, of the materials. In the following, the relationship between the stiffness of the housing and the material of the housing may be taken as an example. In some embodiments, the housing may include a shell panel, a shell back panel, and a housing side. The shell panel, the shell back panel, and the housing side may be made of the same material, or may be made of different materials. For example, the shell back panel and the shell panel may be made of the same material, and the housing side may be made of other materials. In some embodiments, under some conditions, the larger the Young's modulus of the housing material, the greater the stiffness of the housing. The peak and valley of the frequency response curve of the earphone may change to the high frequency, which is beneficial to adjust the peak and valley of the high frequency to a higher frequency. In some embodiments, the Young's modulus of the housing material may be adjusted to adjust the peak and valley of the frequency response curve to higher frequencies. In some embodiments, materials with a specific Young's modulus may be used. The Young's modulus of the housing may be greater than 2000 Mpa. Preferably, the Young's modulus of the housing may be greater than 4000 Mpa. Preferably, the Young's modulus of the housing may be greater than 6000 Mpa. Preferably, the Young's modulus of the housing may be greater than 8000 Mpa. Preferably, the Young's modulus of the housing may be greater than 12000 MPa, and more preferably, the Young's modulus of the housing may be greater than 15000 Mpa. Further preferably, the Young's modulus of the housing may be greater than 18000 MPa.

In some embodiments, by adjusting the stiffness of the housing, the high-frequency peak-valley frequency in the frequency response curve of the bone conduction earphones may not be less than 1000 Hz. Preferably, the high-frequency peak-valley frequency may not be less than 2000 Hz. Preferably, the high-frequency peak-valley frequency may not be less than 4000 Hz. Preferably, the high-frequency peak-valley frequency may not be less than 6000 Hz. More preferably, the high-frequency peak-valley frequency may not be less than 8000 Hz. More preferably, the high-frequency peak-valley frequency may not be less than 10000 Hz. More preferably, the high-frequency peak-valley frequency may not be less than 12000 Hz. Further preferably, the high-frequency peak-valley frequency may not be less than 14000 Hz. Further preferably, the high-frequency peak-valley frequency may not be less than 16000 Hz. Further preferably, the high-frequency peak-valley frequency may not be less than 18000 Hz. Further preferably, the high-frequency peak-valley frequency may not be less than 20000 Hz. In some embodiments, by adjusting the stiffness of the housing, the high-frequency peak-valley frequency in the frequency response curve of the bone conduction earphones may be outside the hearing range of the human ear. In some embodiments, by adjusting the stiffness of the housing, the high-frequency peak-valley frequency in the frequency response curve of the earphone may be within the hearing range of the human ear. In some embodiments, when there are a plurality of high-frequency peaks/valleys, by adjusting the stiffness of the housing, one or more high-frequency peak/valley frequencies in the frequency response curve of the bone conduction earphones may be outside the hearing range of the human ear, and the remaining one or more high-frequency peak/valley frequencies may be within the hearing range of the human ear. For example, the second high-frequency peak may be located outside the hearing range of the human ear, so that the first high-frequency valley and the first high-frequency peak are located within the hearing range of the human ear.

In some embodiments, improving the stiffness of the housing may be achieved by changing the connection mode of the shell panel, the shell back panel, and the housing side to ensure that the whole housing has greater stiffness. In some embodiments, the shell panel, the shell back panel, and the housing side may be formed as a whole. In some embodiments, the shell back panel and the housing side may be formed as a whole. The shell panel and the housing side may be fixed directly by glue, or fixed by means of snapping or welding. The glue may be a glue with strong viscosity and high hardness. In some embodiments, the shell panel and the housing side may be formed as a whole, and the shell back panel and the housing side may be fixed directly by glue, or fixed by means of snapping or welding. The glue may be a glue with strong viscosity and high hardness. In some embodiments, the shell panel, shell back panel, and housing side may be independent components. The three may be fixedly connected by glue, snapping or welding, or the like, or any combination thereof. For example, the shell panel and the housing side may be connected by glue, and the shell back panel and the housing side may be connected by snapping or welding. As another example, the shell back panel and the housing side may be connected by glue, and the shell panel and the housing side may be connected by snapping or welding.

In some embodiments, materials with different Young's modulus may be used to match to improve the overall stiffness of the housing. In some embodiments, the shell panel, the shell back panel, and the housing side may be made of one material. In some embodiments, the shell panel, the shell back panel, and the housing side may be made of different materials, and different materials may have the same Young's modulus or different Young's modulus. In some embodiments, the shell panel and the shell back panel may be made of the same material, and the housing side may be made of other materials. The Young's modulus of the two materials may be the same, or different. For example, the Young's modulus of the material of the housing side may be greater than that of the shell panel and the shell back panel, or the Young's modulus of the material of the housing side may be less than that of the shell panel and shell back panel. In some embodiments, the shell panel and the housing side may be made of the same material, and the shell back panel may be made of other materials. The Young's modulus of the two materials may be the same or different. For example, the Young's modulus of the material of the shell back panel may be greater than that of the shell panel and the housing side, or the Young's modulus of the material of the shell back panel may be less than that of the shell panel and the housing side. In some embodiments, the shell back panel and the housing side may be made of the same material, and the shell panel may be made of other materials. The Young's modulus of the two materials may be the same or different. For example, the Young's modulus of the material of the shell panel may be greater than that of the shell back panel and the housing side, or the Young's modulus of the material of the shell panel may be less than that of the shell back panel and the housing side. In some embodiments, the materials of the shell panel, the shell back panel, and the housing side may be all different. The Young's modulus of the three materials may be the same or different, and all be greater than 2000 MPa.

In some embodiments, by adjusting the stiffness of the vibration transmission sheet and the earphone fixing component, the two resonance peak frequencies of the low-frequency range of the bone conduction earphone may both be less than 2000 Hz. Preferably, the two resonance peak frequencies of the low-frequency range of the bone conduction earphone may be less than 1000 Hz. More preferably, the two resonance peak frequencies of the low-frequency range of the bone conduction earphone may be less than 500 Hz.

In some embodiments, by adjusting the stiffness of each component of the bone conduction earphone (e.g. the housing, the housing bracket, the vibration transmission sheet, or the earphone fixing component), the peaks and valleys in the high-frequency range may be adjusted to higher frequencies, and the low-frequency resonance peak may be adjusted to lower frequencies to ensure a frequency response curve platform in the range of 1000 Hz to 10000 Hz, thereby improving the sound quality of the bone conduction earphones.

On the other hand, the bone conduction earphones may cause sound leakage during the vibration transmission. The sound leakage refers to the vibration of the internal components of the bone conduction earphone or the vibration of the housing may cause the volume of the surrounding air to change, causing the surrounding air to form a compressed area or a sparse area and propagate to the surroundings, resulting in transmitting sound to the surrounding environment, so that persons other than the wearer of the bone conduction earphone may hear the sound from the earphone. The present disclosure may provide a solution to reduce the leakage of the bone conduction earphones by changing the structure or the stiffness of the housing.

In some embodiments, the sound leakage of the bone conduction speaker may be further effectively reduced by a well-designed vibration generating part including a vibration transmission layer (not shown in the figures). Preferably, setting holes on the surface of the vibration transmission layer may reduce sound leakage. For example, the vibration transmission layer may be glued to the panel, and the bonded region on the vibration transmission layer may be more convex than the non-bonded region on the vibration transmission layer. A cavity may be located below the non-bonded region. The non-bonded region and the housing surface on the vibration transmission layer may be respectively provided with sound introduction holes. Preferably, the non-bonded region with a part of the sound introduction holes may not be in contact with the user. On the one hand, the sound introduction holes may effectively reduce the area of the non-bonded region on the vibration transmission layer, allow the air inside and outside the vibration transmission layer to pass through, reduce the difference in air pressure between the inside and outside, and thus reduce the vibration of the non-bonded region. On the other hand, the sound introduction holes may lead the sound wave formed by the internal air vibration of the housing to the outside of the housing, and cancel the leaked sound wave formed by the housing vibration pushing the air outside the housing, thereby reducing the amplitude of the leaked sound wave.

In some embodiments, an angle between the direction of the driving force generated by the driving device and the direction of the panel may not be unique. In FIGS. 8-16, the way of setting the driving device and the panel are exemplified from the perspective of different embodiments.

Embodiment One

Figure 8:
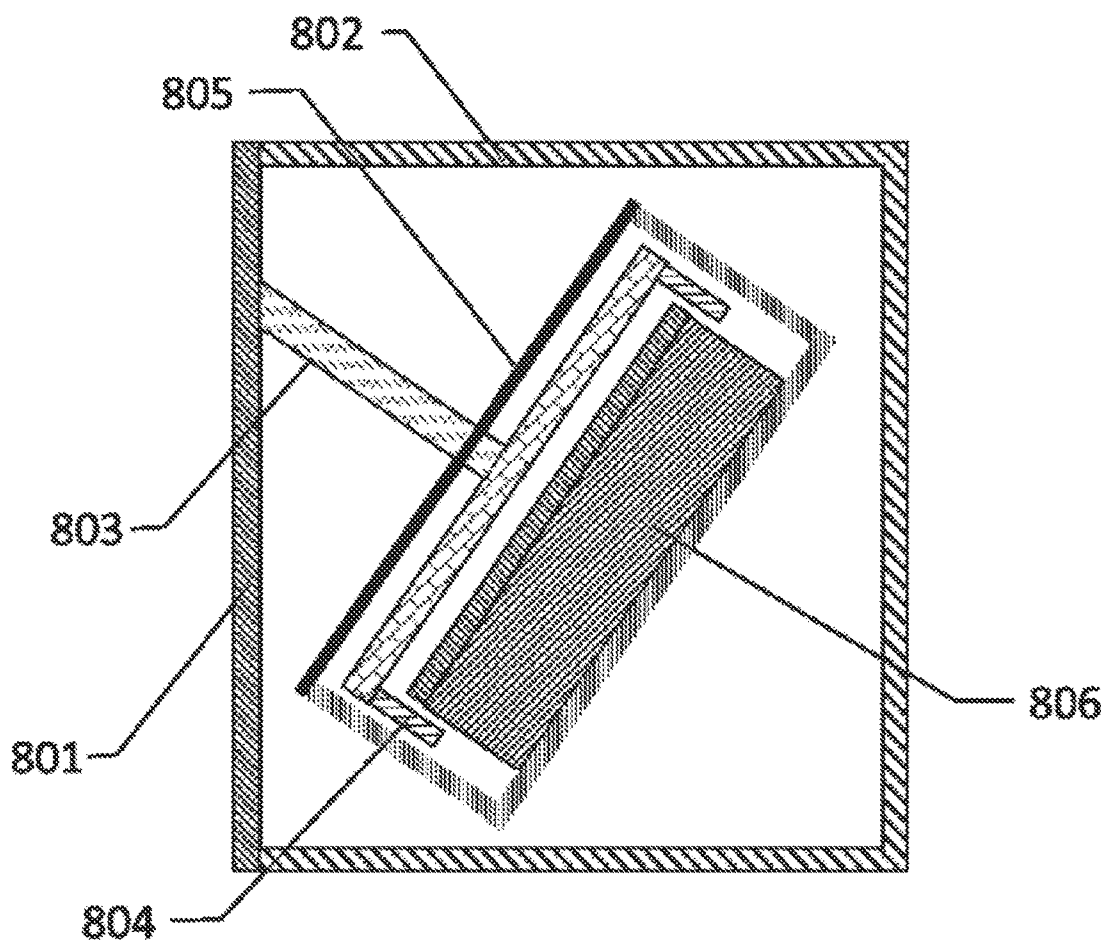
FIG. 8 is a schematic diagram illustrating an axial sectional structure of an exemplary bone conduction speaker according to Embodiment 1 of the present disclosure.

FIG. 8 is a schematic diagram illustrating an axial sectional structure of an exemplary bone conduction speaker according to Embodiment 1 of the present disclosure. As shown in FIG. 8, in some embodiments, the bone conduction speaker 800 may include a panel 801, a housing 802, a first transmission component 803, a coil 804, a vibration transmission sheet 805, and a magnetic system 806. The panel 801 and the housing 802 may form a closed or quasi-closed cavity, and the driving device including the first transmission component 803, the coil 804, the vibration transmission sheet 805, and the magnetic system 806 may be located in the cavity.

In some embodiments, both the coil 804 and the magnetic system 806 may have ring structures. In some embodiments, the coil 804 and the magnetic system 806 may have mutually parallel axis. The axis of the driving device refers to the axis of the coil 804 and/or the magnetic system 806. The axis of the driving device and the normal line of the region on the panel for contacting or abutting the user's body may form an angle θ, and 0°<θ<90°. Specifically, the axis of the driving device and the normal line of the region on the panel for contacting or abutting the user's body may form the angle θ. More descriptions about the axis of the coil 804 or the magnetic system 806 and its spatial relationship with the normal line may be found elsewhere in the present disclosure (see, e.g., FIG. 3 and the descriptions thereof).

In some embodiments, a part of the first transmission component 803 may have a ring structure adapted to the structure of the coil 804. The ring structure may be mechanically connected to one end surface of the coil 804, and the other part of the first transmission component 803 may be a connecting rod mechanically connected to the panel and/or the housing. All or part of the coil 804 may be sleeved on the magnetic gap of the magnetic system 806. All or part of the coil 804 may be sleeved in the annular groove of the magnetic system 806. In some embodiments, an annular end surface of the magnetic system 806 may be mechanically connected to the outer edge of the vibration transmission sheet 805. The first transmission component 803 may pass through the middle region of the vibration transmission sheet 805 and be fixedly connected to it.

After electrifying, the coil 804 may generate ampere force and vibration in the magnetic field that is generated by the magnetic system 806, and transmit the vibration of the coil 804 to the panel 801 through the first transmission component 803. The vibration generated by the reaction force received by the magnetic system 806 may be directly transmitted to the first transmission component 803 through the vibration transmission sheet 805, and further be transmitted to the panel 801. The vibration of the coil 804 and the vibration of the magnetic system 806 may be transmitted to the skin and bones of the human body through the panel 801, so that people can hear sound. It may be understood that, since the vibration transmission sheet is directly connected to the magnetic system 806 and the first transmission component 803, the vibration generated by the magnetic system 806 may be directly transmitted to the panel through the first transmission component 803. Further, the vibration generated by the coil 804 and the vibration generated by the magnetic system 806 may form a composite vibration to be transmitted to the panel 801, and then the composite vibration may be transmitted to the skin and bones of the human body through the panel 801, so that people can hear bone conduction sound.

Embodiment Two

Figure 9A:
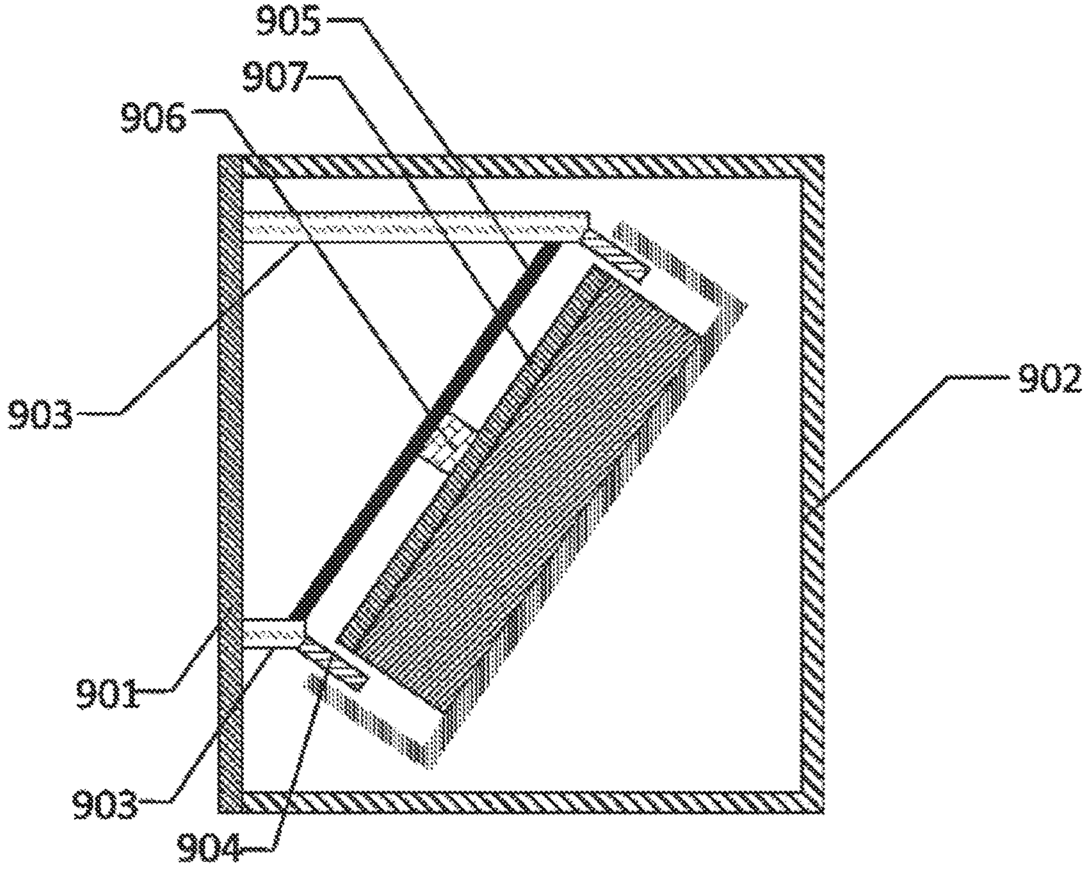
FIG. 9A is a schematic diagram illustrating an axial sectional structure of an exemplary bone conduction speaker according to Embodiment 2 of the present disclosure.

FIG. 9A is a schematic diagram illustrating an axial sectional structure of an exemplary bone conduction speaker according to Embodiment 2 of the present disclosure. The bone conduction speaker 900*a* may include a panel 901, a housing 902, a first transmission component 903, a coil 904, a vibration transmission sheet 905, a second transmission component 906, and a magnetic system 907. The first transmission component 903 may be a hollow cylinder, one end surface of the first transmission component 903 may be mechanically connected to the panel 901, and the other end surface of the first transmission component 903 may be mechanically connected to one end of the coil 904. All or part of the coil 904 may be sleeved in the annular groove or the magnetic gap of the magnetic system 907. It should be understood that both the coil 904 and the magnetic system 907 may have ring structures. In some embodiments, the coil 904 and the magnetic system 907 may have mutually parallel axis. More descriptions about the axis of the coil 904 or the magnetic system 907 and its spatial relationship with the normal line of the region on the panel for contacting or abutting the user's body may be found elsewhere in the present disclosure (see, e.g., FIG. 3 and the descriptions thereof). A center or a region near the center of the magnetic system 907 may be mechanically connected to one end of the second transmission component 906, and the other end of the second transmission component 906 may be mechanically connected to a center region or a region near the center of the vibration transmission sheet 905. The outer edge of the vibration transmission sheet 905 may be mechanically connected to the inside of the flange of the first transmission component 903. A connection method may include, but is not limited to, a clamping connection, a hot-pressing connection, a bonded connection, an injection molding connection, or the like.

In this embodiment, after electrifying, the coil 904 may generate ampere force and vibration in the magnetic field generated by the magnetic system 907, and transmit the vibration of the coil 904 to the panel 901 through the first transmission component 903. The vibration generated by the reaction force received by the magnetic system 907 may be transmitted to the panel 901 through the second transmission component 906, the vibration transmission sheet 905, and the first transmission component 903. The vibration of the coil 904 and the vibration of the magnetic system 907 may be transmitted to the skin and bones of the human body through the panel 901, so that people can hear sound. In short, the vibration generated by the coil 904 and the vibration generated by the magnetic system 907 may form a composite vibration to be transmitted to the panel 901, and then the composite vibration may be transmitted to the skin and bones of the human body through the panel 901, so that people can hear bone conduction sound.

The embodiment shown in FIG. 9A may be different from that shown in FIG. 8. As shown in FIG. 9A, the first transmission component may be changed from a connecting rod to a hollow cylindrical structure, so that the combination of the first transmission component and the coil may be more sufficient and the structure may be more stable. At the same time, the frequency of the higher-order modes (i.e., the vibration at different points on the speaker is inconsistent) of the speaker may be increased, and the low-frequency resonance peak of the frequency response curve of the bone conduction speaker may be moved to a lower frequency, so that the flat region of the frequency response curve may be wider and the sound quality of the speaker may be improved.

Figure 9B:
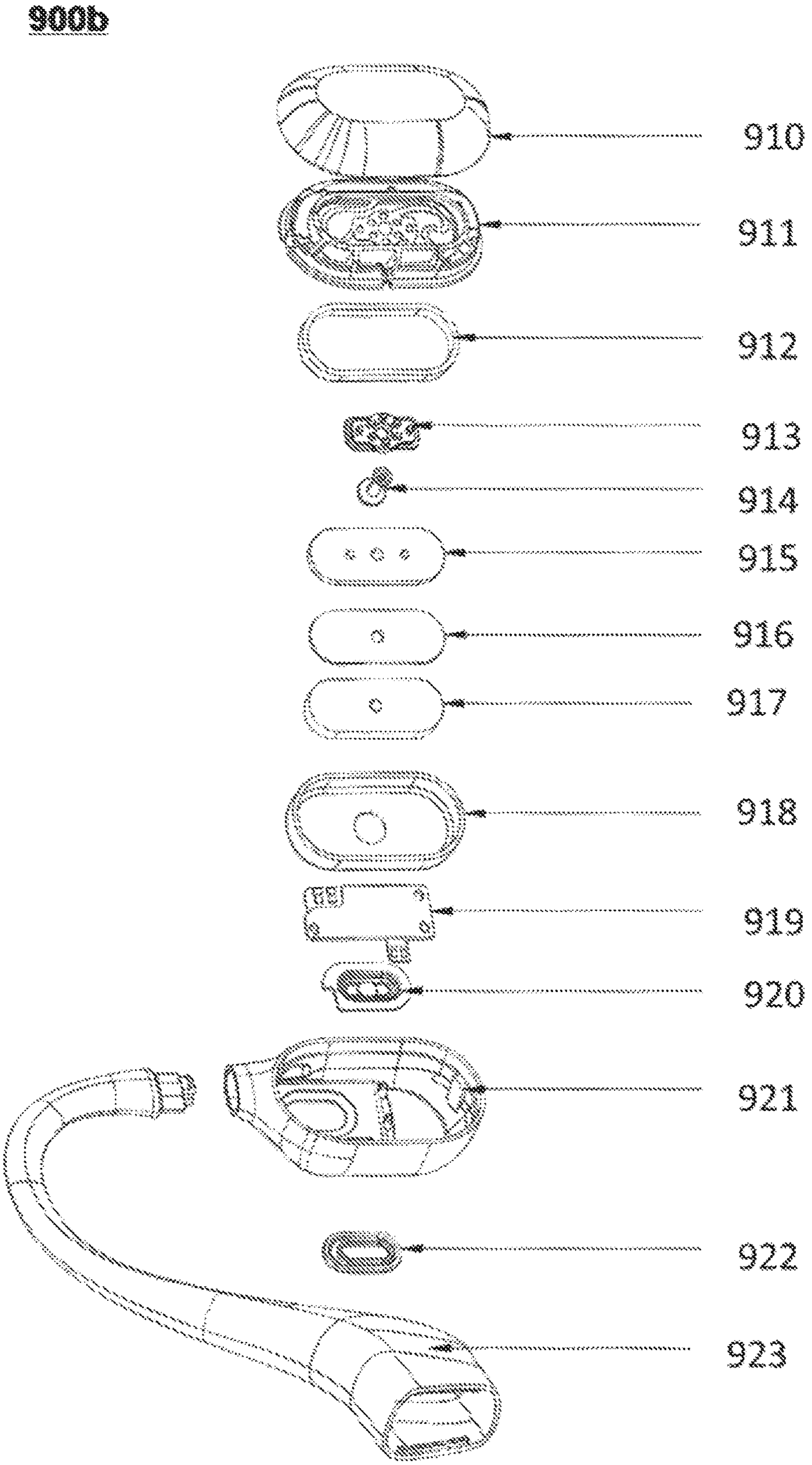
FIG. 9B is a schematic diagram illustrating a disassembled structure of an exemplary bone conduction speaker according to Embodiment 2 of the present disclosure.
Figure 9C:
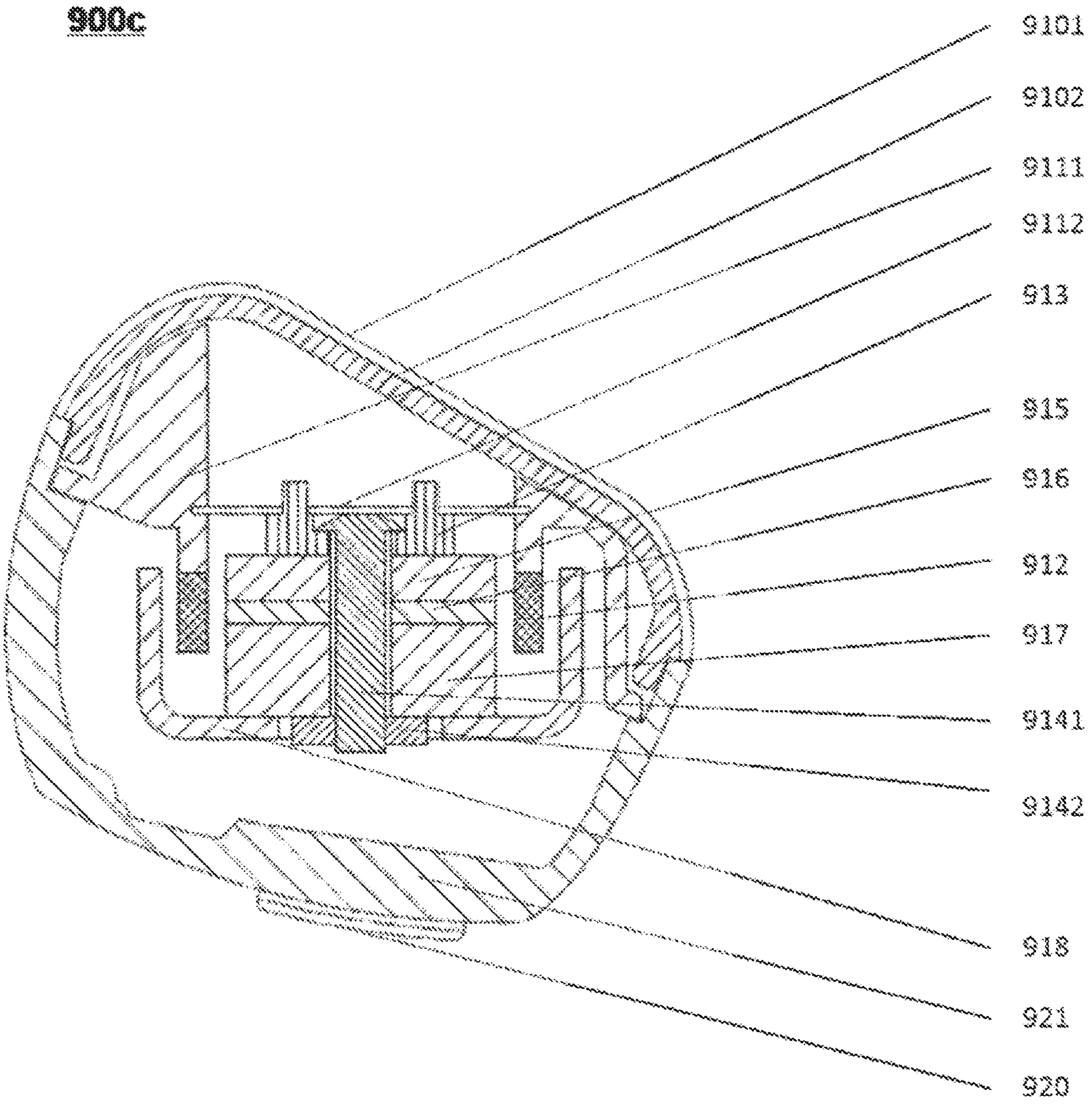
FIG. 9C is a schematic diagram illustrating a longitudinal sectional structure of an exemplary bone conduction speaker in FIG. 9B according to some embodiments of the present disclosure.

FIG. 9B is a schematic diagram illustrating a disassembled structure of an exemplary bone conduction speaker according to Embodiment 2 of the present disclosure. FIG. 9C is a schematic diagram illustrating a longitudinal sectional structure of an exemplary bone conduction speaker in FIG. 9B according to some embodiments of the present disclosure. The structure of the bone conduction speaker shown in FIG. 9B and FIG. 9C may correspond to that shown in FIG. 9A.

As shown in FIG. 9B, the bone conduction speaker 900*b* may include a vibration plate and a face-attached silicone component 910, a bracket and a vibration transmission sheet 911, a coil 912, a connection component 913, a bolt and nut assembly 914, a upper magnet 915, a magnetically conductive plate 916, a lower magnet 917, a magnetically conductive cover 918, a multi-function key PCB 919, a multi-function button silicone 920, a speaker shell 921, an ear-hook multi-function button 922, and an ear-hook 923. As shown in FIG. 9C, the vibration plate and the face-attached silicone component 910 may further include a face-attached silicone 9101 and a vibration plate 9102. The bracket and the vibration transmission sheet 911 may further include a bracket 9111 and a vibration transmission sheet 9112. The bolt and nut assembly 914 may further include a bolt 9141 and a nut 9142. The vibration plate 9102 may be functionally equivalent to the aforementioned panel, and the face-attached silicone 9101 may be equivalent to a soft material covering the panel. It can be understood that the face-attached silicone 9101 may not be an essential part. In some embodiments, the face-attached silicone 9101 can be omitted. The bracket 9111 may correspond to the aforementioned first transmission component. The connection component 913 may correspond to the aforementioned second transmission component. The speaker shell 921 may be equivalent to the aforementioned housing.

Figure 9D:
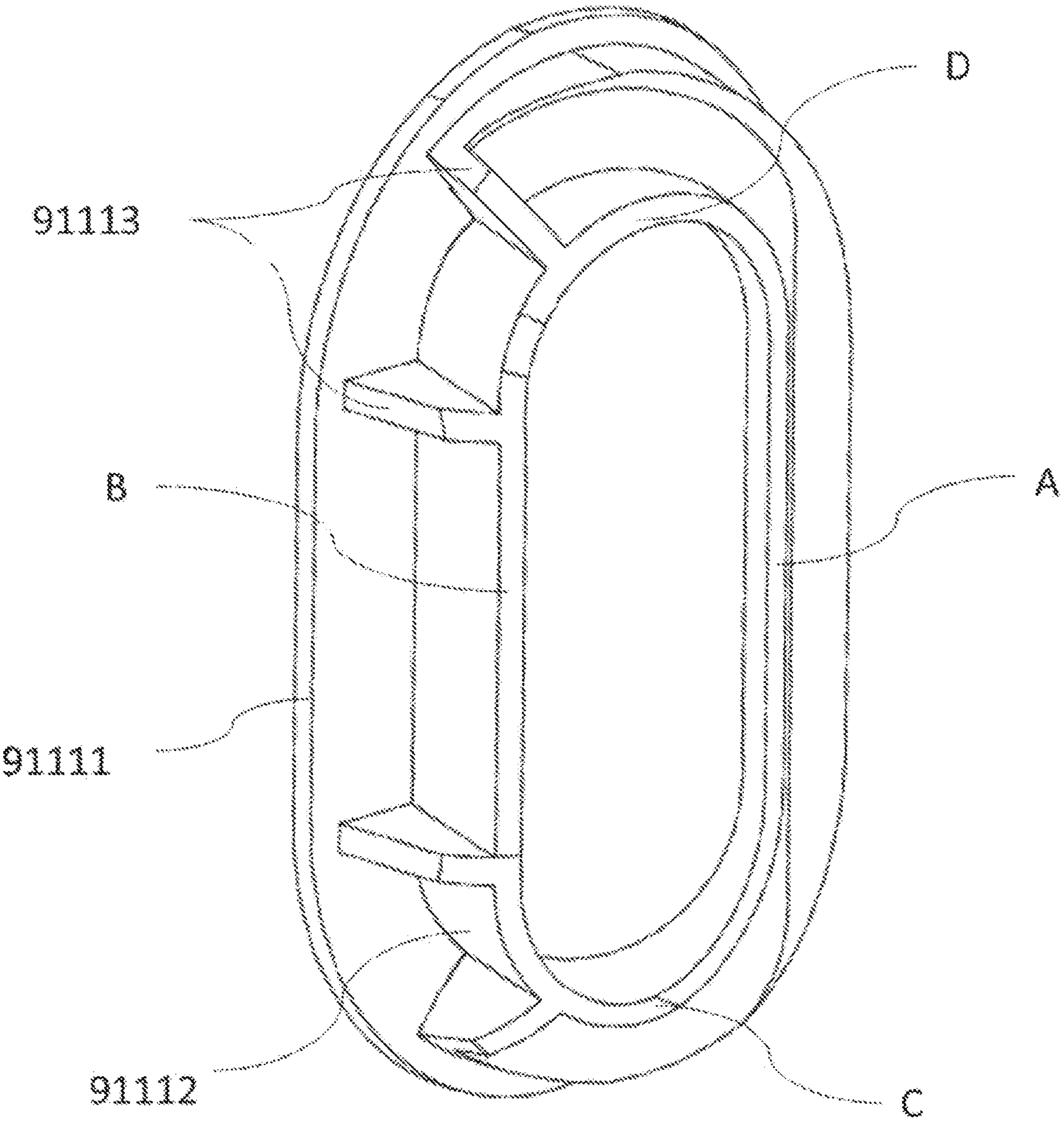
FIGS. 9D and 9E are schematic diagrams illustrating structures of a bracket in an exemplary bone conduction speaker according to some embodiments of the present disclosure.
Figure 9E:
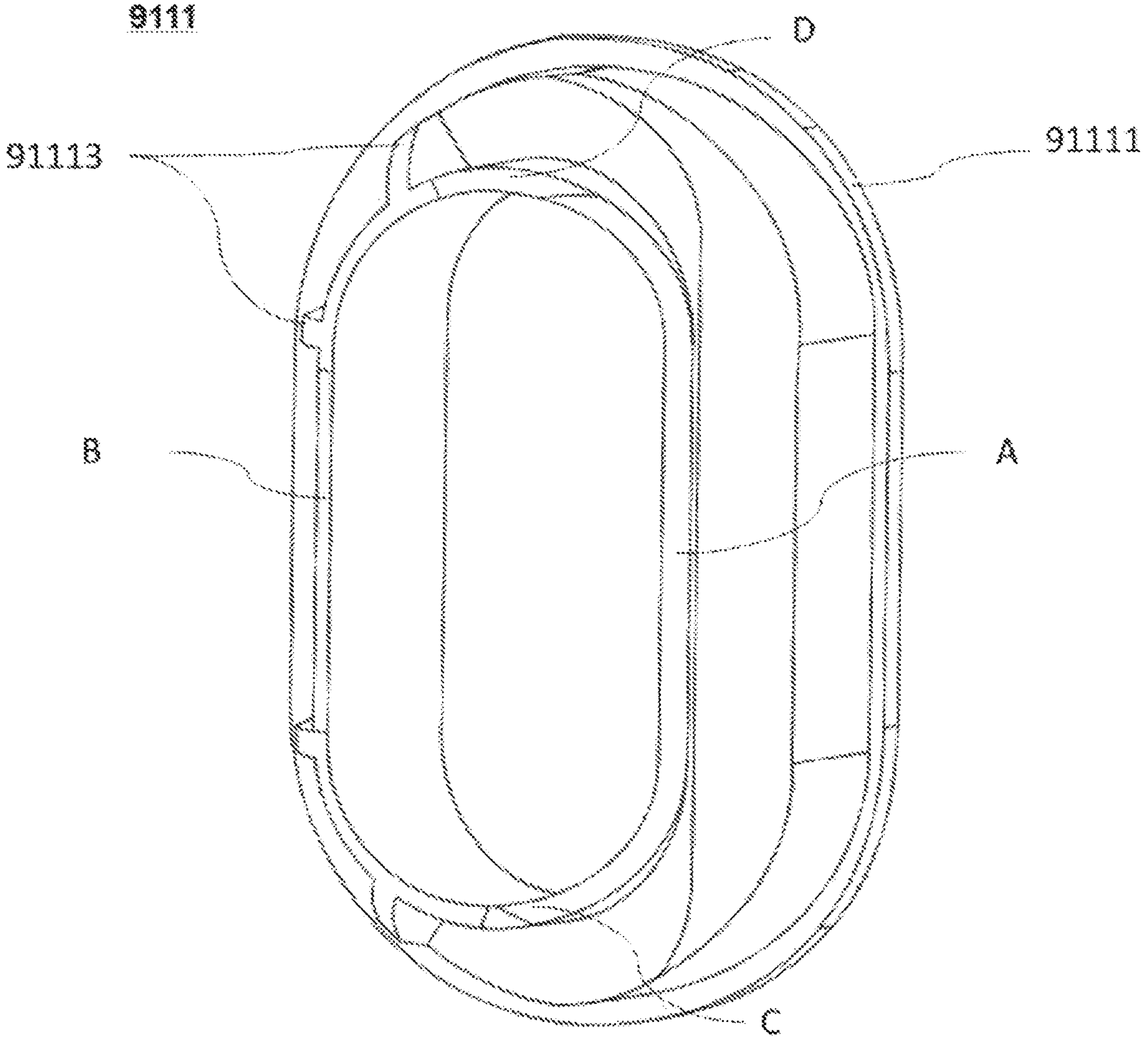

As shown in FIG. 9C, the vibration plate and the face-attached silicone component 910 may be combined with the speaker shell 921 to form a closed or quasi-closed cavity to accommodate the magnetic system, the transmission component and other components. The magnetically conductive cover 918 may have a concave structure, and specifically include a bottom plate and a sidewall. The upper magnet 915, the magnetically conductive plate 916, and the lower magnet 917 may be stacked on the bottom plate of the magnetically conductive cover 918 from top to bottom. The upper magnet 915, the magnetically conductive plate 916, the lower magnet 917, and the magnetically conductive cover 918 may be respectively provided with through holes, and be assembled together by the bolt and nut assembly 914 to form a magnetic system. A magnetic gap may be formed between the magnetically conductive cover 918 and the upper magnet 915, the magnetically conductive plate 916, and the lower magnet 917 provided on the bottom plate. The coil 912 may be partially or wholly disposed in the magnetic gap. As shown in FIG. 9D and FIG. 9E, the bracket 9111 may have a ring structure with uneven thickness. Specifically, one side may be thicker than the other side. The size of one end surface of the bracket 9111 may be compatible with the coil 912 and mechanically connected to one end surface of the coil 912, and the other end of the bracket 9111 may abut or be mechanically connected with the vibration plate and the face-attached silicone component 910. The structure of the bracket 9111 with one side thicker than the other side may tilt the drive device relative to the vibration plate and the face-attached silicone component 910, thereby ensuring that the axis of the driving device (or the direction of the driving force) and a normal line of the contact surface (the surface in contact with the human skin) of the face-attached silicone component 910 have an angle θ. The connection component 913 may connect the upper magnet 915 in the magnetic system with the vibration transmission sheet 9112, and at the same time perform functions as a vibration transmission. The specific connection method may include, but is not limited to, a bolted connection, a bonded connection, a welded connection, or the like. The edge of the vibration transmission sheet 9112 may be snapped onto the inside of the bracket 9111. The bracket 9111 may also perform functions for transmitting the vibration of the coil and the vibration of the magnetic system to the vibration plate and the face-attached silicone component 910. The outer edge of the bracket may be snapped into a groove or a limiting slot on the inner wall of the speaker shell 921, and then be fixed in the cavity, so that while the bracket can realize the transmission, it can also start to suspend or support the entire driving device.

FIGS. 9D and 9E are schematic diagrams illustrating structures of a bracket in an exemplary bone conduction speaker according to some embodiments of the present disclosure. As shown in FIGS. 9D and 9E, merely by way of example, the bracket 9111 may have a ring-shaped body 91111. The body may be a ring-shaped sheet structure, and a ring-shaped facade 91112 adapted to the shape of the body may be provided on the body. One side of the facade 91112 may be lower than the other side (e.g., the side of the facade A is lower than the side of the facade B). The transition between the high side and the low side may be performed through the connection portions C and D with continuously changing heights, or non-continuously changing heights. For example, the connection portions C and D are configured in a stepped structure with discontinuous changes in height. It should be noted that the A side, the B side, the connection part C, and the connection part D may be regarded as four different parts of the facade 91112, and may be integrally formed with each other without obvious boundary in structure. The A side, the B side, the connection portion C, and the connection portion D may also be structurally independent from each other, and be assembled together by an additional connection method. The specific connection method may include, but is not limited to, a bonded connection, a welded connection, a hot-melt connection, or the like. The bracket 9111 may be used to connect the coil with the vibration plate and the face-attached silicone component 910 to realize vibration transmission. Specifically, the bottom end surface of the bracket body 91111 may be fixedly connected to the upper end surface of the coil, and the upper end surface of the facade 91112 may abut or be mechanically connected with the vibration plate and the face-attached silicone component 910 (refer to FIG. 9C). In some embodiments, the distance between the vibration plate and the face-attached silicone component 910 and the driving device (e.g., a coil) may be relatively long, so that the height of the facade may be large. If the facade 91112 is thin, the strength may be low and easily damaged, if the facade 91112 is thick and heavy, it will affect the transmission and affect the sound quality. In some embodiments, several stiffener 91113 may be provided on the outside or inside of the facade 91112, which may ensure the strength of the facade 91112 without affecting the sound quality. In some embodiments, the stiffener 91113 may be a smaller facade perpendicular to the facade 91112, one end surface of which may be mechanically connected to the body 91111, and the other end surface may be mechanically connected to the facade 91112. The connection method may include, but is not limited to, a bonded connection, a welded connection, a thermoplastic molding, an integral molding, or the like. In some embodiments, the stiffener 91113 may also be a short strut. The strut may be diagonally supported between the facade and the body. One end of the strut may be mechanically connected to the body 91111, and the other end may be mechanically connected to the facade 91112. The connection method may include, but is not limited to, a bonded connection, a welded connection, a thermoplastic molding, an integral molding, or the like.

Embodiment Three

Figure 10:
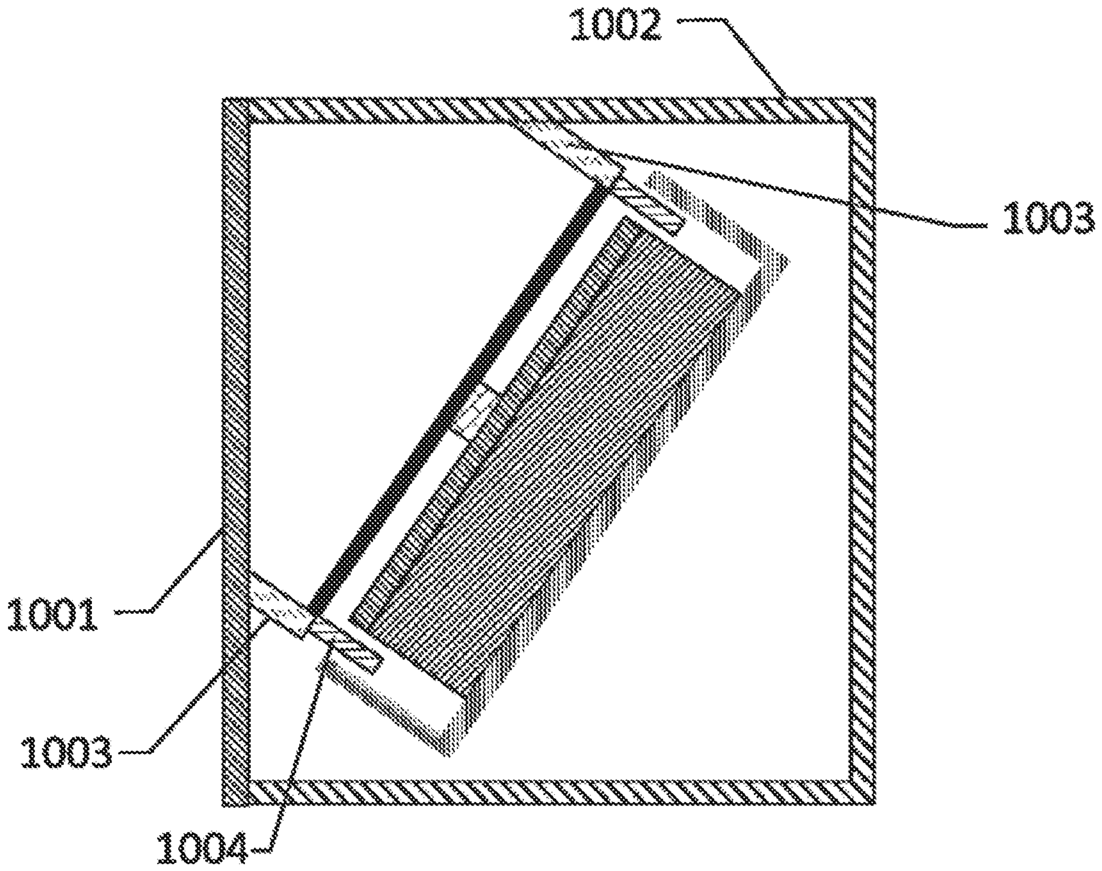
FIG. 10 is a schematic diagram illustrating an axial sectional structure of an exemplary bone conduction speaker according to Embodiment 3 of the present disclosure.

FIG. 10 is a schematic diagram illustrating an axial sectional structure of an exemplary bone conduction speaker according to Embodiment 3 of the present disclosure. Compared with the bone conduction speaker 900, the difference of the bone conduction speaker 1000 may be the installation position and length of the first transmission component 1003. The first transmission component 1003 may include a plurality of connecting rods or connecting posts. One end of a part of the connecting rods may be mechanically connected to the panel 1001. One end of the other part of the connecting rods may be mechanically connected to the first side 1002 of the housing, and the other end of each connecting rod may be mechanically connected to one end surface of the coil 1004. That is, each connecting rod may be distributed between the coil and the panel and/or the housing along the coil 1004, and the connecting rods may be distributed at equal intervals or may be distributed at different intervals. As a variant of this embodiment, the first transmission component 1003 may also be designed as a hollow cylinder like the first transmission component 903, and its cross section may be adapted to the size and shape of the coil. A first end surface of the first transmission component 1003 may be mechanically connected to one end of the coil, a portion of the second end surface of the first transmission component 1003 may be mechanically connected to the panel 1001, and the other portion may be mechanically connected to the housing 1002.

Compared with the bone conduction speaker 900, the length of the first transmission component 1003 in the bone conduction speaker 1000 may be smaller, which may further increase the frequency at which the speaker generates higher-order modes (i.e., the vibrations at different points of the speaker are inconsistent).

Embodiment Four

Figure 11:
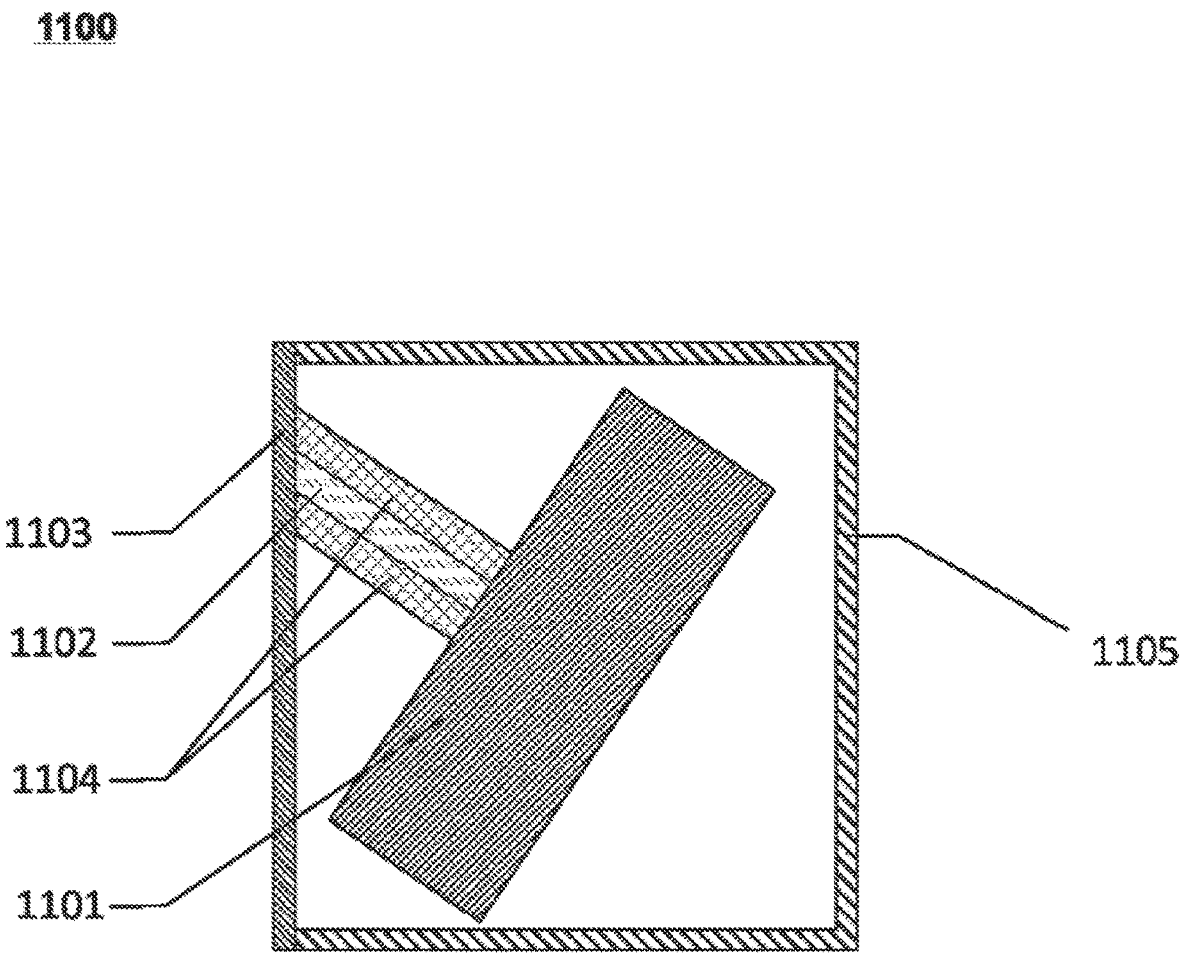
FIG. 11 is a schematic diagram illustrating an axial sectional structure of an exemplary bone conduction speaker according to Embodiment 4 of the present disclosure.

FIG. 11 is a schematic diagram illustrating an axial sectional structure of an exemplary bone conduction speaker according to Embodiment 4 of the present disclosure. As shown in FIG. 11, the bone conduction speaker 1100 may include a driving device 1101, a transmission component 1102, a panel 1103, and a housing 1105. The transmission component 1102 may include structures such as a vibration transmission sheet, a connecting rod, and a connecting post. The transmission component 1102 may be mechanically connected to the driving device 1101 and the panel 1103 as a transmission path to transmit vibration or driving force generated by the driving device 1101 to the panel 1103. In some embodiments, the distance between the panel and the driving device is relatively long, the length of the transmission path needs to be large. Furthermore, the length of the transmission component may also be required to be larger. For example, the length of the connecting rod or the connecting post may be required to be larger. If the structure of the transmission component is thin, the strength may be relatively low, and the long-term vibration may cause damaged. If the structure of the transmission component is set thicker and thicker in order to overcome the problem, it may also affect the transmission of vibration and then affect the sound quality. In some embodiments, an additional stiffener 1104 may be provided on the surface of the transmission component to increase the strength of the transmission component and have a small impact on the structure of the transmission component. In some embodiments, the stiffener 1104 may include a facade, a ridge, a strut, or the like. The connection methods between the stiffener 1104 and the transmission component 1102 may include, but are not limited to, a bonded connection, a welded connection, a thermoplastic molding, an integral molding, or the like. In some embodiments, a plurality of stiffener 1104 may be provided on the surface of the transmission component. For annular transmission components, the stiffeners may be distributed at equal or unequal intervals around the circumference of the transmission component. More descriptions about the stiffener may be found elsewhere in the present disclosure (see, e.g., FIG. 9D and FIG. 9E and the descriptions thereof).

Compared with other embodiments, the bone conduction speaker 1100 shown in FIG. 11 may have a stiffener 1104 added to the transmission component. While increasing the strength of the transmission component, it may increase the frequency at which the speaker generates higher-order modes (i.e., the vibrations at different points of the speaker are inconsistent), which may make the sound better.

Embodiment Five

Figure 12:
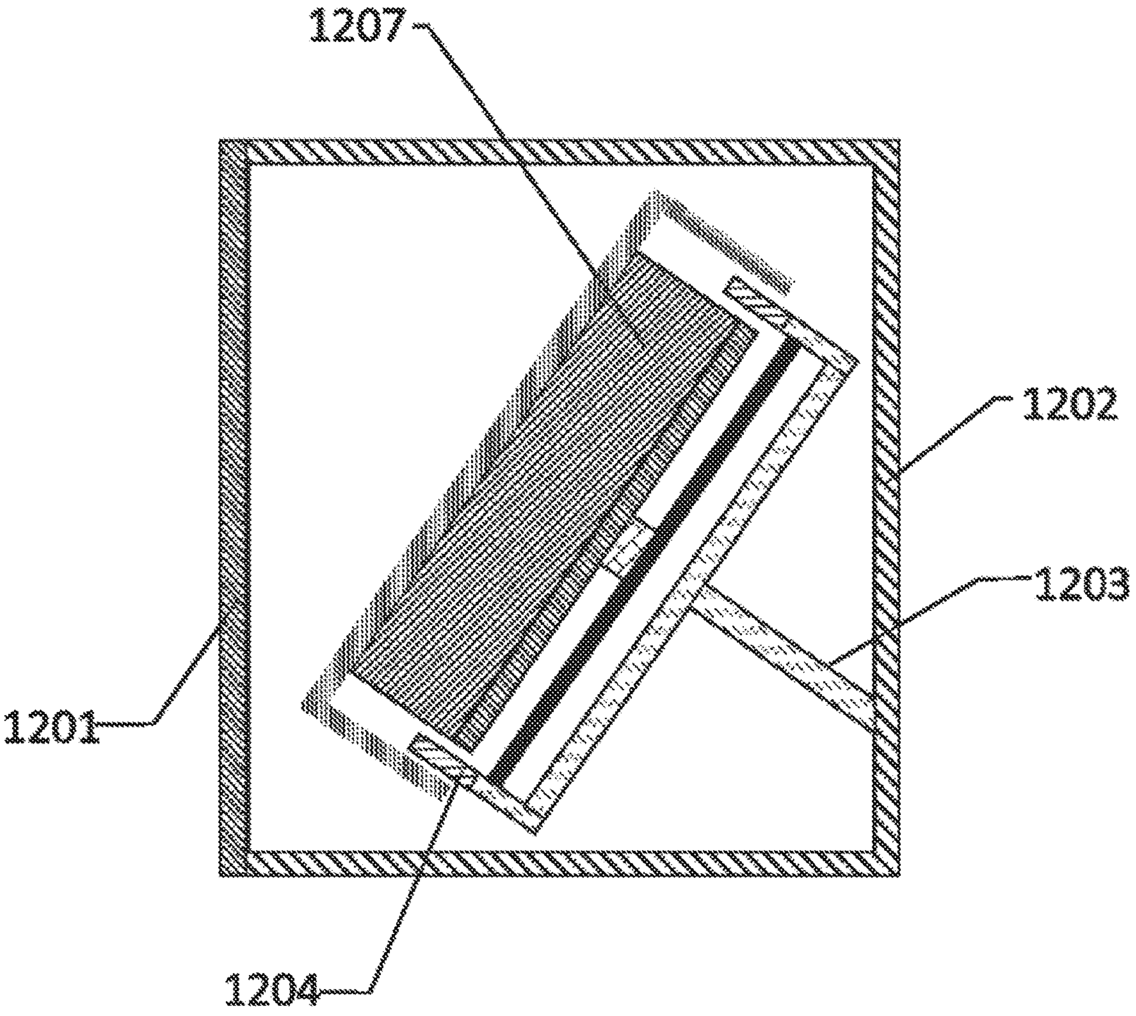
FIG. 12 is a schematic diagram illustrating an axial sectional structure of an exemplary bone conduction speaker according to Embodiment 5 of the present disclosure.

FIG. 12 is a schematic diagram illustrating an axial sectional structure of an exemplary bone conduction speaker according to Embodiment 5 of the present disclosure. As shown in FIG. 12, in some embodiments, one end of the first transmission component 1203 of the bone conduction speaker 1200 may be mechanically connected to a bottom surface of the housing 1202, that is, the entire driving device may be inclined and fixed to the housing 1202 relative to the panel.

Specifically, both the housing 1202 and the panel 1201 may have a large hardness, and the two may be integrally formed or connected through a connection medium with a relatively high stiffness. After electrifying, the vibration generated by the coil 1204 and the vibration generated by the magnetic system 1207 may form a composite vibration to be transmitted to the housing 1202, and then to the panel 1201. The composite vibration may be transmitted to the skin and bones of the human body through the panel 1201, so that people can hear bone conduction sounds.

Embodiment Six

Figure 13:
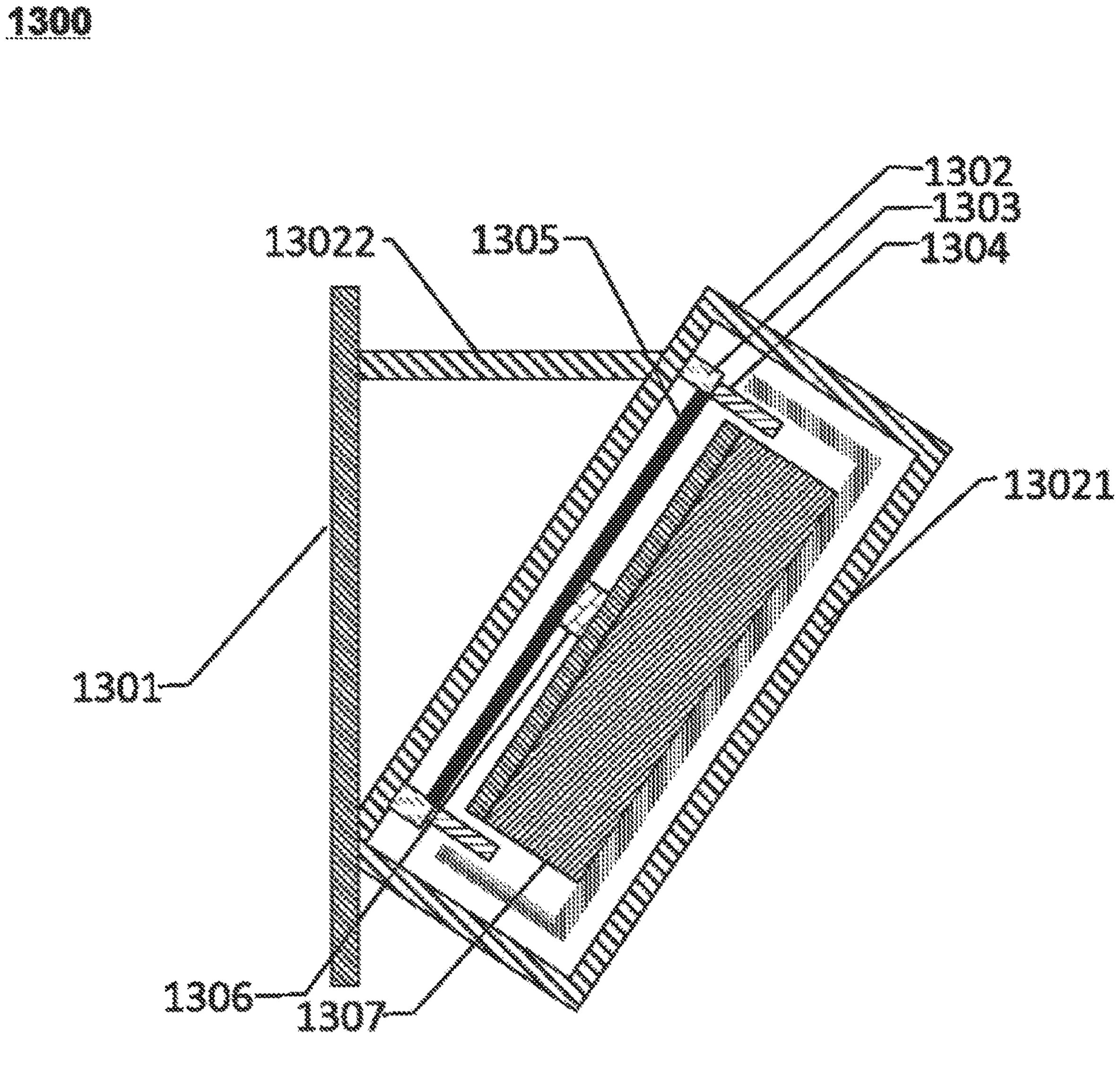
FIG. 13 is a schematic diagram illustrating an axial sectional structure of an exemplary bone conduction speaker according to Embodiment 6 of the present disclosure.

FIG. 13 is a schematic diagram illustrating an axial sectional structure of an exemplary bone conduction speaker according to Embodiment 6 of the present disclosure. As shown in FIG. 13, in some embodiments, the bone conduction speaker 1300 may include a housing 1302, a panel 1301 provided independently of the housing, and a driving device. The driving device may include a first transmission component 1303, a coil 1304, a vibration transmission sheet 1305, a second transmission component 1306, and a magnetic system 1307. The housing 1302 may include a first housing 13021 and a third transmission component 13022. The first housing 13021 may be a cuboid having a cavity. In some embodiments, the first housing 13021 may be a closed cylinder, a sphere having a cavity, or the like. The driving device may be located in the cavity, the internal structure of the driving device may be any one of the foregoing embodiments.

An upper side of the first housing 13021 may be mechanically connected to an upper side of the panel 1301 through the third transmission component 13022, and a lower side of the first housing 13021 may be directly connected to a lower side of the panel 1301. The connection method between the first housing 13021 and the panel 1301 may not be limited to the foregoing method. For example, the lower side of the first housing 13021 may be mechanically connected to the lower side of the panel 1301 through the third transmission component 13022, and the upper side of the first housing 13021 may be directly connected to the upper side of the panel 1301. As another example, only the middle region of the first housing 13021 may be mechanically connected to the panel through the third transmission component. The third transmission component may be a rod-like, a plate-like, or a hollow column-like structure.

In this embodiment, after electrifying, the coil 1304 may generate ampere force and vibration in the magnetic field generated by the magnetic system 1307, and transmit the vibration of the coil 1304 to the first housing 13021 through the first transmission component 1303. The first housing 13021 may transmit the vibration to the panel 1301 through the third transmission component 13022 or directly. The vibration generated by the reaction force received by the magnetic system 1307 may be transmitted to the first housing 13021 through a connection between the second transmission component 1306 and the vibration transmission sheet 1305. The first housing 13021 may transmit the vibration to the panel 1301 through the third transmission component 13022 or directly. The vibration of the coil 1304 and the vibration of the magnetic system 1307 may be transmitted to the skin and bones of the human body through the panel 1301, so that people can hear sounds. In short, the vibration generated by the coil 1304 and the vibration generated by the magnetic system 1307 may form a composite vibration to be first transmitted to the first housing 13021, and then be transmitted to the panel 1301 directly or through the third transmission component 13022. The composite vibration may be transmitted to the skin and bones of the human body through the panel 1301, so that people can hear bone conduction sound.

Embodiment Seven

Figure 14:
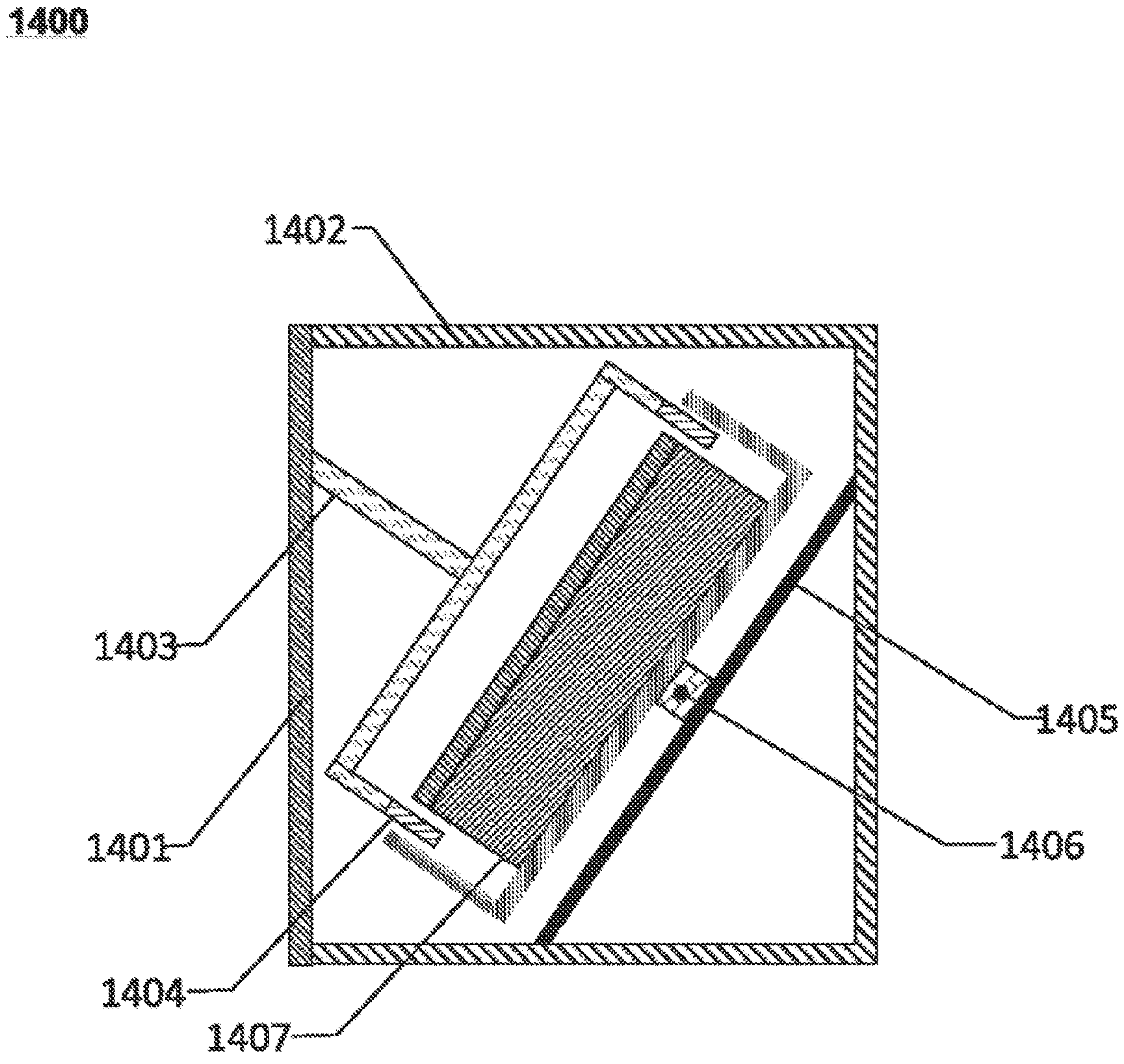
FIG. 14 is a schematic diagram illustrating an axial sectional structure of an exemplary bone conduction speaker according to Embodiment 7 of the present disclosure.

FIG. 14 is a schematic diagram illustrating an axial sectional structure of an exemplary bone conduction speaker according to Embodiment 7 of the present disclosure. As shown in FIG. 14, the bone conduction speaker 1400 may have a first transmission path and a second transmission path that are independent of each other. Specifically, the first transmission path may include a first transmission component 1403. The transmission component on the second transmission path may include a vibration transmission sheet 1405 and a second transmission component 1406. The bone conduction speaker 1400 having a first transmission path and a second transmission path independent of each other may mean that there is no common transmission component in the two transmission paths.

As shown in FIG. 14, the bone conduction speaker 1400 may include a panel 1401, a housing 1402, a first transmission component 1403, a coil 1404, a vibration transmission sheet 1405, a second transmission component 1406, and a magnetic system 1407. The panel 1401 and the housing 1402 may form a closed or quasi-closed cavity, and a driving device including the first transmission component 1403, the coil 1404, the vibration transmission sheet 1405, the second transmission component 1406, and the magnetic system 1407 may be located in the cavity. An axis of the driving device and the normal line of the region on the panel for contacting or abutting the user's body may form an angle θ, and $0° < \theta < 90°$. A bottom surface of the magnetic system 1407 may be mechanically connected to the vibration transmission sheet 1405 through the second transmission component 1406, and an outer edge of the vibration transmission sheet 1405 may be mechanically connected to the housing 1402. For example, the outer edge of the vibration transmission sheet 1405 may be mechanically connected to the bottom of housing 1402, or the side of the housing 1402, or one part may be mechanically connected to the bottom of housing 1402, and the other part may be mechanically connected to the side of the housing 1402.

In this embodiment, after electrifying, the coil 1404 may generate ampere force and vibration in the magnetic field generated by the magnetic system 1407, and transmit the vibration of the coil 1404 to the panel 1401 through the first transmission component 1403. The vibration generated by the reaction force received by the magnetic system 1407 may be transmitted to the bottom and the side of the housing 1402 through the second transmission component 1406 and the vibration plate 1405. The housing may transmit the vibration of the magnetic system 1407 to the panel 1401. Finally, the vibration of coil 1404 and the vibration of magnetic system 1407 may be transmitted to the skin and bones of the human body through the panel 1401, which may make people hear sounds. It may be understood that, since the vibration transmission sheet is directly connected to the housing 1402, the magnetic system and the housing 1402 may be soft-connected. The vibration generated by magnetic system 1407 may be directly transmitted to the bottom surface of housing 1402 and one side of housing 1402. The vibration generated by the coil 1404 and the vibration generated by the magnetic system 1407 may form a composite vibration to be transmitted to the panel 1401. When the composite vibration is transmitted to the skin and bones of the human body through the panel 1401, people can hear bone conduction sound.

Embodiment Eight

Figure 15:
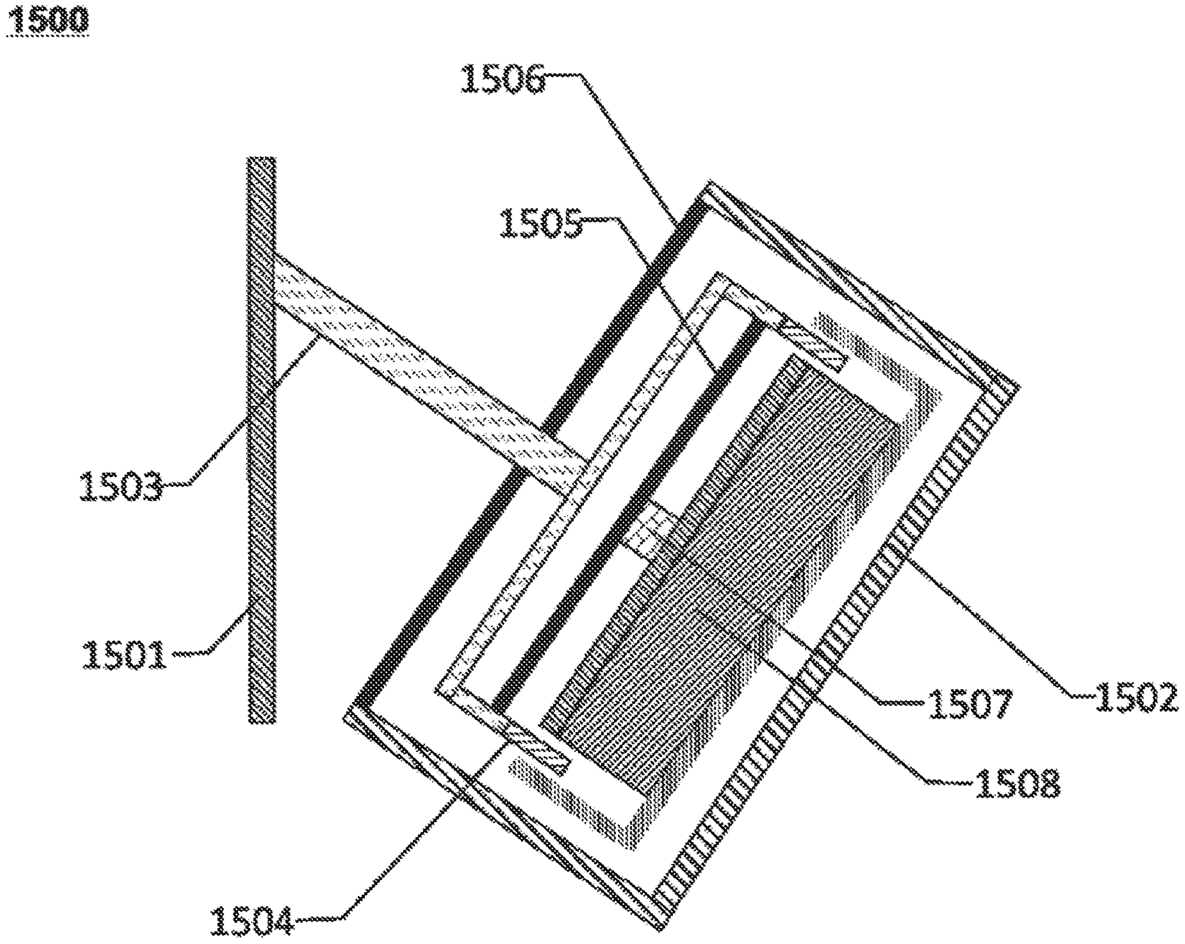
FIG. 15 is a schematic diagram illustrating an axial sectional structure of an exemplary bone conduction speaker according to Embodiment 8 of the present disclosure.

FIG. 15 is a schematic diagram illustrating an axial sectional structure of an exemplary bone conduction speaker according to Embodiment 8 of the present disclosure. The bone conduction speaker 1500 shown in FIG. 15 may include a dual vibration transmission sheet structure. The low-frequency range of the speaker's vibration frequency response curve may have an extra peak, which may make the speaker's low-frequency response more sensitive, thereby improving sound quality. Specifically, as shown in FIG. 15, the bone conduction speaker 1500 may include a panel 1501, a housing 1502, a first transmission component 1503, a coil 1504, a first vibration transmission sheet 1505, a second vibration transmission sheet 1506, a second transmission component 1507, and a magnetic system 1508. The connection method between the panel 1501, the first transmission component 1507, the first vibration transmission sheet 1505, the second transmission component 1507, and the magnetic system 1508 may be the same as that shown in FIG. 9. An edge of the second vibration transmission sheet 1506 may be mechanically connected to an opening end surface of the housing 1502. The first transmission component 1503 may pass through the middle region of the second vibration transmission sheet 1506 and be fixedly connected to it. A center axis surface of the second vibration transmission sheet 1506 may be snapped onto the solid cylindrical body of the first transmission component 1503.

The working principle of the bone conduction speaker 1500 in this embodiment may be as the following description. After electrifying, the coil 1504 may generate ampere force and vibration in the magnetic field generated by the magnetic system 1508, and transmit the vibration of the coil 1504 directly to the panel 1501 through the first transmission component 1503. The vibration generated by the reaction force received by the magnetic system 1508 may be transmitted to the panel 1501 through the second transmission component 1507 and the first vibration transmission sheet 1505. The vibration of the housing 1502 may be transmitted to the panel 1501 through the second vibration plate. Then the vibration of coil 1504 and the vibration of magnetic system 1508 may be transmitted to the skin and bones of the human body through the panel 1501, so that people can hear the sound. It may be understood that the soft connection between panel 1501 and housing 1502 may be realized through the second vibration transmission sheet 1506. The vibration generated by the coil 1504 and the vibration generated by the magnetic system 1508 may form a composite vibration to be transmitted to the panel 1501 and the housing 1502. Then the composite vibration may be transmitted to the skin and bones of the human body through the panel 1501, such that people can hear bone conduction sound.

Embodiment Nine

Figure 16:
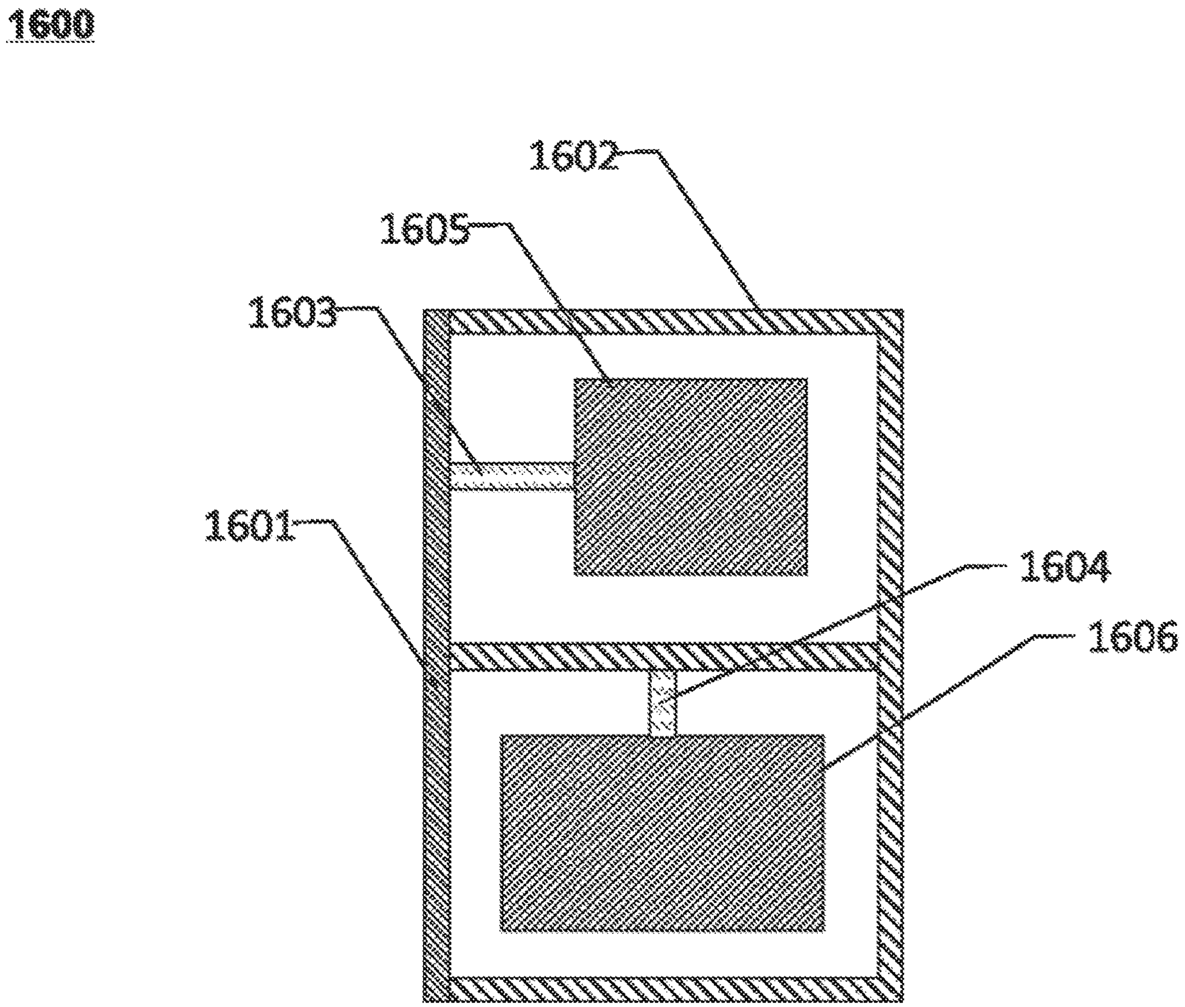
FIG. 16 is a schematic diagram illustrating an axial sectional structure of an exemplary bone conduction speaker according to Embodiment 9 of the present disclosure.

FIG. 16 is a schematic diagram illustrating an axial sectional structure of an exemplary bone conduction speaker according to Embodiment 9 of the present disclosure. As shown in FIG. 16, in yet another embodiment, the bone conduction speaker 1600 may include a panel 1601, a housing 1602, and two driving devices 1605 and 1606. The panel 1601 and the housing 1602 may form a closed or quasi-closed cavity, and the two driving devices 1605 and 1606 may be located inside the cavity. The driving device in this embodiment may be the driving device in the foregoing embodiments of the present disclosure. The driving device 1605 may be mechanically connected to the panel 1601 through a first transmission component 1603. The driving device 1606 may be mechanically connected to a partition provided in the cavity through a second transmission component 1604. A certain angle may be formed between the driving device 1605 and the driving device 1606. In some embodiments, the driving device 1606 may be directly connected to a panel or a housing through a second transmission component 1604 bent at a right angle. It should be noted that, in some embodiments, an axis of the driving device 1605 may not be parallel to the normal line of the panel, and an axis of the driving device 1606 may not be perpendicular to the normal line of the panel. The position of the two driving devices relative to the panel may be that the straight line of the resulting direction of the driving force generated by the two driving devices and the normal line of the region on the panel for contacting or abutting the user's body may form an angle θ, and $0° < \theta < 90°$. It can be further understood that the count of driving devices may also be 3, 4, or even more. By adjusting the position of each driving device in the cavity, the straight line of the resulting direction of the driving force generated by each driving device and the normal line of the region on the panel for contacting or abutting the user's body may form an angle θ, and $0° < \theta < 90°$.

In this embodiment, the driving force of the driving device 1605 may be parallel to the normal line of the region on the panel for contacting or abutting the user's body. The driving force of the driving device 1606 may be perpendicular to the normal line of the region on the panel for contacting or abutting the user's body. The two driving devices may vibrate at the same time, and the two kinds of vibrations may be transmitted to the panel, and then the composite vibration may be transmitted to the skin and bones of the human body through the panel 1601, so that people can hear bone conduction sound.

The present disclosure also provides bone conduction earphones. During use, the earphone holder/earphone strap may fix the bone conduction speaker to a specific part of the user (e.g., the head) and provide a clamping force between the vibration unit and the user. The contact surface may be connected to the driving device and keep contact with the user to transmit the sound to the user through vibration. If the bone conduction speaker has a symmetrical structure, and assuming that the driving forces provided by the two driving devices on both sides are the same with the directions opposite, the center point of the earphone holder/earphone strap may be chosen as the equivalent fixed end. If the bone conduction speaker can provide stereo sound, that is, the magnitude of the instant driving force provided by the two transducing devices are different, or the bone conduction speaker has an asymmetric structure, other points or regions on or out of the earphone rack/earphone strap may be chosen as the equivalent fixed ends. As used herein, the fixed end may be regarded as the equivalent end where the position of the bone conduction speaker is relatively fixed in the process of generating vibration. The fixed end and the vibration unit may be connected through an earphone holder/earphone strap, and the transmission relationship may be related to the earphone holder/earphone strap and the clamping force provided by the earphone holder/earphone strap, which may depend on the physical properties of the earphone holder/earphone strap. Preferably, changing the physical properties such as the clamping force provided by the earphone rack/earphone strap, the quality of the earphone rack/earphone strap, etc., may change the sound transmission efficiency of the bone conduction speaker, thereby affecting the frequency response of the system in a specific frequency range. For example, an earphone holder/earphone strap made of a higher-strength material and an earphone holder/earphone strap made of a lower-strength material may provide different clamping forces, or changing the structure of an earphone holder/earphone strap, such as adding an auxiliary device that may provide elastic force to the earphone holder/earphone strap, may also change the clamping force, thereby affecting the sound transmission efficiency. Changes in the size of the earphone holder/earphone strap, when worn, may also affect the size of the clamping force. The clamping force may increase with the distance between the vibration units at both ends of the earphone holder/earphone strap.

In order to obtain an earphone holder/earphone strap that meets specific clamping force conditions, those skilled in the art may choose materials with different rigidities and different moduli to make earphone racks/earphone straps or adjust the size of the earphone racks/earphone straps. It should be noted that the clamping force of the earphone holder/earphone strap may not only affect the efficiency of sound transmission, but also affect the user's sound experience in the low-frequency range. The clamping force mentioned here may be the pressure between the contact surface and the user. Preferably, the clamping force may be in a range from 0.1N to 5N. More preferably, the clamping force may be in a range from 0.2N to 4N. More preferably, the clamping force may be in a range from 0.2N to 3N. More preferably, the clamping force may be in a range from 0.2N to 1.5N, and more preferably, the clamping force may be in a range from 0.3N to 1.5N.

It should be noted that the foregoing embodiments of the bone conduction speaker may only be merely by way of example, and the components and structures described in these embodiments should not be taken as a limitation on the present disclosure. The components, shapes, structures, and connection methods in these embodiments may be combined. For example, the stiffener in FIG. 11 may be applied to any of the embodiments shown in FIGS. 9 to 16. The first transmission component 903 of the bone conduction speaker **900*a* in FIG. 9 may also be connected to the panel and housing at the same time as the first transmission component 1003 of the bone conduction speaker 1000 and may also be connected to the rear of the housing like the bone conduction speaker 1200**.

Figure 17:
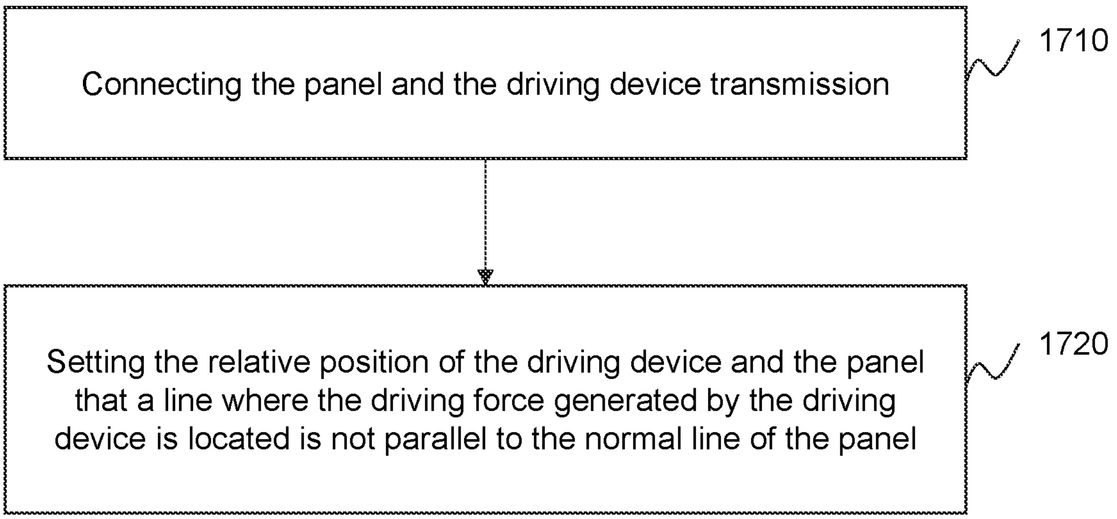
FIG. 17 is a flowchart illustrating a method for setting a bone conduction speaker according to some embodiments of the present disclosure.

FIG. 17 is a flowchart illustrating a method for setting a bone conduction speaker according to some embodiments of the present disclosure. Method 1700 may be steps included in setting a bone conduction speaker according to a specific embodiment of the present disclosure.

In 1710, the panel and driving device transmission may be connected. In some embodiments, a transmission component such as a vibration transmission sheet and a connection component may be used to connect the driving device to the panel. In addition to the structural connection, the transmission component may also play a role in transmitting vibration. Specifically, the driving device may include a coil and a magnetic system. The vibration of the coil and the magnetic system may be transmitted to the panel and/or housing via different routes. For example, the vibration of the coil may be transmitted to the panel and/or housing through a first transmission path, and the vibration of the magnetic system may be transmitted to the panel and/or housing through a second transmission path. The first transmission path may include a first transmission component. The second transmission path may include a second transmission component, a vibration transmission sheet, and a first transmission component. The first transmission component may be a connecting post or a connecting rod. The second transmission component may be a connecting post or a connecting rod.

In some embodiments, the bone conduction speaker may transmit the vibration generated by the driving device to the panel by connecting the driving component of the panel and the driving device, thereby further transmitting the vibration to the human body through the panel attached to the human body. The transmission connection between the panel and the driving device may effectively transfer the vibration signal generated by the driving device so that the human body may receive the signal. In some embodiments, panels, transmission components, and driving devices are generally rigid materials and are rigidly connected to each other to improve the quality of the transmitted audio signal.

In 1720, the relative position of the driving device and the panel may be set, so that a line where the driving force generated by the driving device is located is not parallel to the normal line of the panel. Specifically, the relative positions of the driving device and the panel may be set according to the foregoing various embodiments. The adopted setting method may include changing the structure of the transmission component. For example, setting the transmission component to a structure with one side lower than the other side to ensure that the straight line where the driving force is located is not parallel to the normal line of the panel. The adopted setting method may also include improving the structure of the panel or housing to achieve the technical purpose. For example, a platform tilted relative to the panel may be set in the housing, and a driving device may be set on the platform. As another example, the driving device may be set horizontally in the housing, and the panel may be tilted to cover the housing. As long as the driving device can be tilted relative to the panel so that the straight line where the driving force is located is not parallel to the normal line of the region on the panel for contacting or abutting the user's body, any method may be applied to the present disclosure, and the present disclosure makes no restrictions on this.

It should be noted that there is no necessary sequence in the two steps of setting the bone conduction speaker. The order of the two steps may be reversed. In some embodiments, the two steps may not be completely separate processes, that is, the two steps may be performed simultaneously. For example, when the driving device is connected to the panel, the relative positional relationship between the two is adjusted.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

Furthermore, unless explicitly stated in the claims, the recited order of processing elements or sequences, the use of numbers, letters, or other designations in the present application are not intended to limit the order of the processes and methods of the present application. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±1%, ±5%, ±10%, or ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A bone conduction speaker, comprising a panel and a driving device, wherein:

the panel is transmissibly connected to the driving device;

all or part of the panel is configured to contact or abut a user's body to conduct sound;

a region where the panel contacting or abutting the user's body has a normal line;

an axis of the driving device is not parallel to the normal line of the region; and the driving device comprises a coil and a magnetic system, the axis of the driving device being perpendicular to a radial plane of the coil and/or a radial plane of the magnetic system.

2. The bone conduction speaker of claim 1, wherein the bone conduction speaker further comprises a housing, and wherein the housing is connected to the panel via a connection medium, or the housing and the panel are integrally formed.

3. The bone conduction speaker of claim 2, wherein the coil is connected to the panel and/or the housing through a connection component.

4. The bone conduction speaker of claim 3, wherein a stiffener is provided on the connection component.

5. The bone conduction speaker of claim 4, wherein the stiffener is a facade or a support rod.

6. The bone conduction speaker of claim 3, wherein one side of the connection component is shorter than the other side of the connection component so that the axis of the coil is not parallel to the normal line of the region.

7. The bone conduction speaker of claim 3, wherein the connection component is a hollow cylinder, one end surface of the hollow cylinder being connected to one end surface of the coil, and the other end surface of the hollow cylinder being connected to the panel and/or the housing.

8. The bone conduction speaker of claim 3, wherein the connection component is a group of connecting rods, one end of each connecting rod being connected to one end surface of the coil, and the other end of each connecting rod being connected to the panel and/or the housing, and the each connecting rod being distributed circumferentially around the coil.

9. The bone conduction speaker of claim 1, wherein the region where the panel contacts or abuts the user's body is a plane.

10. The bone conduction speaker of claim 1, wherein the region where the panel contacts or abuts the user's body is a quasi-plane; and the normal line of the region is an average normal line of the region, the average normal line being:

$$\widehat{r_0} = \frac{\oiint_S \hat{r}ds}{|\oiint_S \hat{r}ds|};$$

where $\widehat{r_0}$ denotes the average normal line; $\hat{r}$ denotes a normal line at any point on the plane, and ds denotes an infinitesimal plane; and the quasi-plane is a plane that an angle between a normal line of any point within at least 50% of the plane and the average normal line is less than a predetermined threshold.

11. The bone conduction speaker of claim 10, wherein the predetermined threshold is less than 10°.

12. The bone conduction speaker of claim 1, wherein an area of the panel is in a range from 20 $mm^2$ to 1000 $mm^2$.

13. The bone conduction speaker of claim 1, wherein a length of a side length of the panel is in a range from 5 mm to 40 mm, or 18 mm to 25 mm, or 11 to 18 mm.

14. The bone conduction speaker of claim 1, wherein the axis of the driving device has a positive direction pointing out of the bone conduction speaker via the panel the normal line of the region has a positive direction pointing out of the bone conduction speaker, and an angle between the axis of the driving device and the normal line of the region in the positive direction is an acute angle.

15. The bone conduction speaker of claim 1, wherein an angle between a straight line where a driving force generated by the driving device is located and the normal line of the region is any value between 5° and 80°, or any value between 15° and 70°, or any value between 25° and 50°, or any value between 25° and 40°, or any value between 28° and 35°, or any value between 27° and 32°, or any value between 30° and 35°, or any value between 25° and 60°, or any value between 28° and 50°, or any value between 30° and 39°, or any value between 31° and 38°, or any value between 32° and 37°, or any value between 33° and 36°, or any value between 33° and 35.8°, or any value between 33.5° and 35°.

16. The bone conduction speaker of claim 1, wherein an angle between a straight line where the driving force generated by the driving device is located and the normal line of the region is 26°±0.2, 27°±0.2, 28°±0.2, 29°±0.2, 30°±0.2, 31°±0.2, 32°±0.2, 33°±0.2, 34°±0.2, 34.2°±0.2, 35°±0.2, 35.8°±0.2, 36°±0.2, 37°±0.2, or 38°±0.2.

17. A bone conduction earphone, comprising:

a bone conduction speaker including a panel and at least one driving device, wherein:

the panel is transmissibly connected to the at least one driving device;

all or part of the panel is configured to contact or abut a user's body to conduct sound;

a region where the panel contacting or abutting the user's body has a normal line;

an axis of the at least one driving device is not parallel to the normal line of the region; and the at least one driving device comprises a coil and a magnetic system, the axis of the at least one driving device being perpendicular to a radial plane of the coil and/or a radial plane of the magnetic system.

18. The bone conduction earphone of claim 17, wherein a count of the at least one driving device is at least two, a straight line of a resulting direction of a driving force generated by the at least two driving devices and the normal line of the region form an angle, the angle being an acute angle.

19. The bone conduction earphone of claim 18, wherein a straight line where a first driving force generated by a first driving device is located is parallel to the normal line, and a straight line where a second driving force generated by a second driving device is located is perpendicular to the normal line.

20. A bone conduction speaker, comprising a driving device configured to generate a driving force, wherein the driving force is located in a straight line; and a panel transmissibly connected to the driving device through a transmission component, wherein all or part of the panel is configured to contact a user's body to conduct sound, wherein a region through which the panel interacts with the user's body has a normal line, and wherein a structure of the transmission component with one side thicker than the other side tilts the drive device relative to the panel, so that the straight line where the driving force is located and the normal line have an angle, the angle being an acute angle.

* * * * *